(12) United States Patent
McCombe et al.

(10) Patent No.: US 8,482,561 B2
(45) Date of Patent: Jul. 9, 2013

(54) SYSTEMS AND METHODS FOR A RAY TRACING SHADER API

(75) Inventors: James Alexander McCombe, San Francisco, CA (US); Luke Tilman Peterson, Oakland, CA (US); Ryan R. Salsbury, San Francisco, CA (US); Sean Matthew Gies, San Francisco, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 871 days.

(21) Appl. No.: 12/563,791

(22) Filed: Sep. 21, 2009

(65) Prior Publication Data

US 2010/0073369 A1    Mar. 25, 2010

Related U.S. Application Data

(60) Provisional application No. 61/099,152, filed on Sep. 22, 2008, provisional application No. 61/101,854, filed on Oct. 1, 2008, provisional application No. 61/172,453, filed on Apr. 24, 2009, provisional application No. 61/219,870, filed on Jun. 24, 2009.

(51) Int. Cl.
*G06T 15/50* (2011.01)
*G06T 15/60* (2006.01)
*G06T 15/06* (2011.01)

(52) U.S. Cl.
CPC ..................................... *G06T 15/06* (2013.01)
USPC .......................................................... 345/426

(58) Field of Classification Search
None
See application file for complete search history.

(56) References Cited

U.S. PATENT DOCUMENTS

| | | | |
|---|---|---|---|
| 5,793,374 A * | 8/1998 | Guenter et al. | 345/426 |
| 5,966,134 A * | 10/1999 | Arias | 345/589 |
| 6,473,773 B1 * | 10/2002 | Cheng et al. | 707/814 |
| 7,030,879 B1 | 4/2006 | Pharr | |
| 7,071,938 B2 | 7/2006 | Herken et al. | |
| 7,333,119 B1 * | 2/2008 | King et al. | 345/611 |
| 7,479,962 B2 | 1/2009 | Herken et al. | |
| 7,830,379 B2 | 11/2010 | Peterson et al. | |

(Continued)

FOREIGN PATENT DOCUMENTS

WO    WO 2008/037599 A1    4/2008

OTHER PUBLICATIONS

Purcell et al.; Ray Tracing on Programmable Graphics Hardware; ACM Trans. Graph. 21 (3) pp. 703-712; Jul. 2002.*

(Continued)

*Primary Examiner* — Carlos Perromat
(74) *Attorney, Agent, or Firm* — Michael S. Garrabrants; ArtesynIP, Inc.

(57) ABSTRACT

Aspects include API interfaces for interfacing shaders with other components and/or code modules that provide ray tracing functionality. For example, API calls may allow direct contribution of light energy to a buffer for an identified pixel, and allow emission of new rays for intersection testing alone or in bundles. The API also can provide a mechanism for associating arbitrary data with ray definition data defining a ray to be tested through a shader using the emit ray call. The arbitrary data is provided to a shader associated with an object that is identified subsequently as having been intersected by the ray. The data can include code, or a pointer to code, that can be used by or run after the shader. The data also can be propagated through a series of shaders, and associated with rays instantiated in each shader.

33 Claims, 11 Drawing Sheets

U.S. PATENT DOCUMENTS

| | | |
|---|---|---|
| 2007/0132754 A1 | 6/2007 | Reshetov et al. |
| 2008/0074420 A1 | 3/2008 | Kuesel et al. |
| 2008/0088622 A1 | 4/2008 | Shearer |
| 2008/0122841 A1 | 5/2008 | Brown et al. |
| 2009/0096788 A1 | 4/2009 | Salsbury et al. |

OTHER PUBLICATIONS

Wald et al.; State of the Art in Interactive Ray Tracing; Eurographics'01; ACM 2001.*

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

S. Parker, S. Boulos, J. Bigler and A. Robison, "RTSL: a Ray Tracing Shading Language," IEEE Symposium on Interactive Ray Tracing, 2007. RT '07, Sep. 10-12, 2007, pp. 149-160, Ulm.

Andreas Dietrich, Ingo Wald, Carsten Benthin and Philipp Slusallek, "The OpenRT Application Programming Interface—Towards a Common API for Interactive Ray Tracing—" Proceedings of the 2003 OpenSG Symposium (Darmstadt, Germany), Eurographics Association, 2003, pp. 23-31.

Andreas Dietrich, Ingo Wald, Carsten Benthin and Philipp Slusallek, "The OpenRT Application Programming Interface—Towards a Common API for Interactive Ray Tracing—" OpenSG 2003, Darmstadt, Germany (Available online at http://graphics.cs.uni-sb.de/fileadmin/cguds/papers/2003/opensg03/ TheOpenRTAPI_OpenSG2003.ppt, last visited Sep. 21, 2009).

James Arvo and David Kirk, "Fast Ray Tracing by Ray Classification," ACM SIGGRAPH Computer Graphics 21 (4), Jul. 1987, pp. 55-64.

* cited by examiner

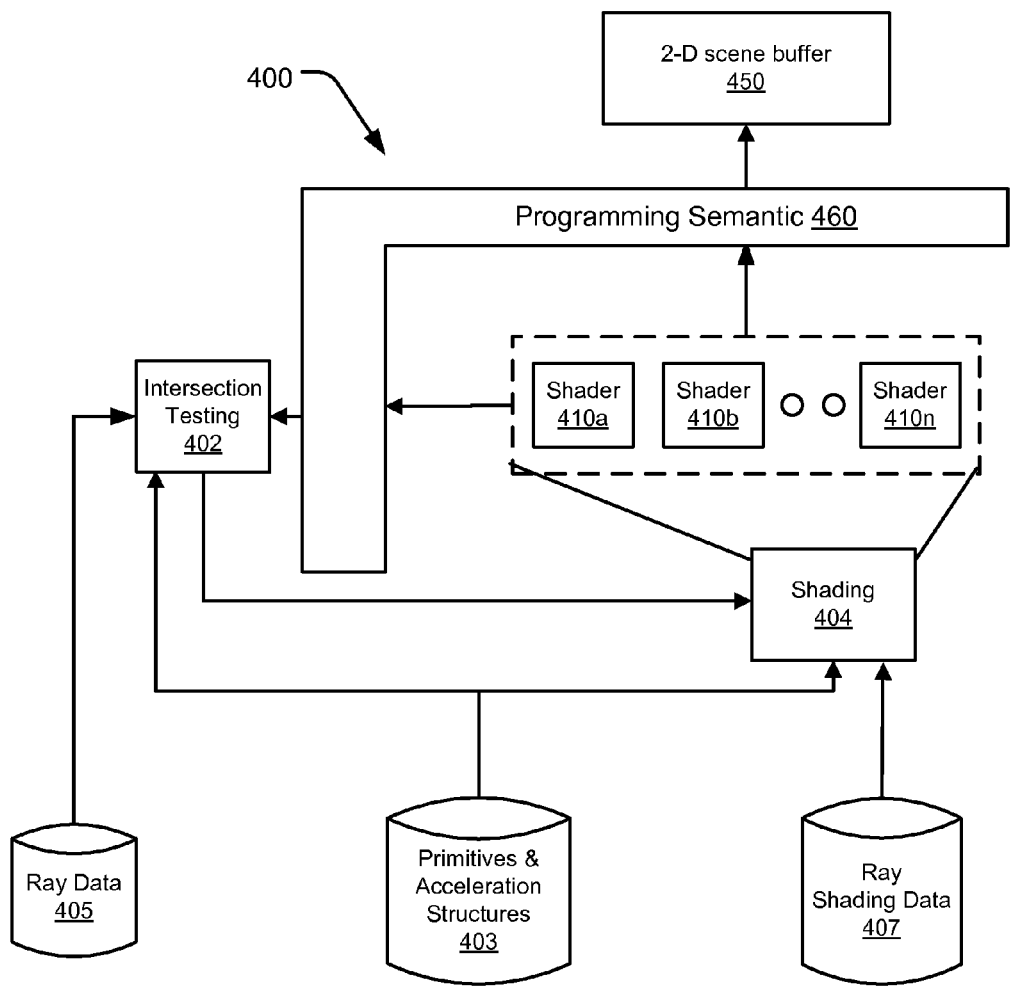
FIG. 4
FIG. 5
| Ray ID 505 | Origin 506 | Direction 507 | Attenuation Vector 508 | Pixel 509 | Additional Data 510 |

FIG. 6

| Program State | |
|---|---|
| Camera Shader | Att. Vector    Ray 130    Pixel    Additional Data |

FIG. 7

| Program State | |
|---|---|
| Mirror Shader Instance 1 | Ray 131    Pixel    Additional Data <br> Att. Vector -> Att. Vector' |

FIG. 8

| Program State | |
|---|---|
| Mirror Shader Instance 2 | Ray 132    Pixel    Additional Data <br> Att. Vector' -> Att. Vector" |

FIG. 9

| Program State | |
|---|---|
| Light Shader Instance 1 | Light 120    Pixel    Additional Data <br> Pixel Contribution = light qualities * Att. Vector" |

Type shadow → origin=parent_intersection; defaultshader=OcclusionCheck
Var rtype={shadow, reflection, refraction, ...)

```
Shader Code 1405a
Calculations ... additional data b.1, additional data b.2...
Emit Ray(origin, direction, additional data a.1)
              o
              o
Emit Ray(origin, direction, additional data a.n)
Emit Ray(origin, direction, parentrayref)
Emit Ray(origin, direction, codepointer)
Emit Ray(origin, direction, code)
Emit Ray(direction, rtype=shadow)
```

```
Shader Code 1405b
Calculations ... additional data a.1, additional data a.2...
Emit Ray(origin, direction, additional data b.1)
              o
              o
Emit Ray(origin, direction, additional data b.n)
```
              o
              o
```
Shader Code 1405n
Calculations ... additional data c.1, additional data c.n...
Emit Ray(origin, direction, additional data n.1)
              o
              o
Emit Ray(origin, direction, additional data n.n)
EmitRayBundle(origin, d1, d2...dn, weight, additional data)
EmitRayBundle(origin, d1, d2, w1, d3 ...dn, weight, additional data)
EmitRayBundle(o1, o2 ... on, destination specifier, weight, additional data)
```
                                                    ⌐ 1422
                                                    ⌐ 1423
                                                    ⌐ 1424

```
Scene Builder 1450
```

| Ray ID 1481 | Origin 1482 | Direction 1483 | additional data b.1 o o  n.n  c.1  b.1 o o 1484 |
|---|---|---|---|

SYSTEMS AND METHODS FOR A RAY TRACING SHADER API

CROSS REFERENCE TO RELATED CASES

This application claims priority from U.S. provisional application No. 61/099,152, entitled, "Shader API for Non-Recursive Ray Tracing", filed on Sep. 22, 2008, from U.S. provisional application No. 61/101,854, filed on Oct. 1, 2008, also entitled, "Shader API for Non-Recursive Ray Tracing", and from U.S. provisional application No. 61/172,453, entitled "Shader API for Non-Recursive Ray Tracing" filed on Apr. 24, 2009, and from U.S. provisional application No. 61/219,870, entitled "Systems and Methods of Defining Rays for Ray Tracing Rendering", filed on Jun. 24, 2009; all above-referenced applications are herein incorporated by reference in their entireties, for all purposes.

BACKGROUND

1. Field

The following relates generally to using ray tracing for rendering 2-D representations of 3-D scenes, and more specifically to aspects of programming and usage of software components for such ray tracing.

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle.

Virtual rays of light are traced into the scene from a view point ("a camera"); each ray is issued to travel through a respective pixel of the 2-D representation, on which that ray can have an effect. The rays are tested for intersection with scene primitives to identify a first intersected primitive for each ray, if any.

After identifying an intersection for a given ray, a shader associated with that primitive determines what happens next. For example, if the primitive is part of a mirror, then a reflection ray is issued to determine whether light is hitting the intersected point from a luminaire, or in more complicated situations, subsurface reflection, and scattering can be modeled, which may cause issuance of different rays to be intersection tested. By further example, if a surface of an object were rough, not smooth, then a shader for that object may issue rays to model a diffuse reflection on that surface. As such, finding an intersection between a ray and a primitive is a step in determining whether and what kind of light energy may reach a pixel by virtue of a given ray, since what light is hitting that primitive still needs to be determined.

Thus, most conventional algorithms build a tree of rays in flight when ray tracing a scene, where the tree continues along each branch until it leaves the scene or hits a luminaire that does not issue new rays. Then, for those branches that hit light emissive objects ("luminaires"), the branches are rolled up through the primitive intersections, determining along the way what effect each primitive intersection has on the light that hits it. Finally, a color and intensity of light for the originally issued camera ray can be determined and stored in the buffer.

This approach to ray tracing is called recursive ray tracing, and has long been a dominant implementation. It is attractive because its operations are described simply: the tree builds by recursively emitting rays to be tested in response to primitive intersections, while they are identified, then, the tree is closed ("rolled up") by feeding results back up.

However, recursive ray tracing can be problematic for a variety of reasons. For example, a large amount of ray state must be maintained while ends of the tree are identified, since state for each ray dependent on an uncompleted branch of rays is stored. Also, a great deal of state for shaders that cannot complete, as they wait for downstream results, is usually stored on a stack. This is so, since rays are traced in order; for example, a child ray is not traced concurrently with a parent ray. The following describes non-recursive ray tracing strategies where state for such rays does not need to be stored, and systems, methods, and code for programmers and other developers to interface with systems and software implementing such strategies.

SUMMARY

Some aspects are directed to provision of a programming interface to which shader code modules can be written, and which allow these shader code modules to effect outputs through a defined programming semantic while the shader code modules execute. In one preferred example, the programming semantic comprises a emit ray call that accepts data definitive of one or more rays to be intersection tested, and other data, such as a pointer to code, code, pixel associations, a color vector, a buffer location identifier, and so on. The programming semantic also allows contribution to a buffer location through a contribution call. After an executing shader module has made some combination of these calls, it can complete execution, freeing up state used by that shader.

For example, a method for interfacing with computer executable shader code comprises accepting, through a ray emit call, definition data for a parent ray and an association of the parent ray to a pixel of a 2-D image to be rendered from a 3-D scene composed of objects. The shader is selected based on an intersection testing result for the parent ray. The method also comprises accepting one or more child rays from the selected shader through the ray emit call during execution, and continuing the pixel association with each of the child rays. The method also comprises selecting one or more shaders based on intersection testing results obtained for at least some of the child rays, and accepting contribution(s) directly into a buffer for the pixel, through a contribute call, from one or more of the shaders selected for the child rays during execution. The contribution(s) to the buffer can be accepted without re-entering the shader for the parent ray.

In some embodiments, the contribute call also can accept redirection of contributions to a specified buffer location other the buffer for the pixel. The redirection can be specified by code, either provided through the contribute call, or referenced by a pointer provided through the contribute call.

Another aspect includes a system for tracing rays in a scene, which comprises a ray intersection testing resource operable to test rays for intersection in the scene, and a buffer for accumulating shading results. The system also comprises computer readable media storing code for implementing a programming interface. The programming interface comprises an emit ray call, for use by shaders to specify rays to be intersection tested, and a contribute call for interfacing shaders with the buffer. The buffer interfacing can be accomplished by accepting, during shader execution, data representative of a result to be contributed directly to one or more locations in the buffer. The system may comprise a shader execution environment for causing the system to select shaders to be executed, responsive to intersection testing results received from the ray intersection testing resource. The shader can be selected using a primitive identifier provided in the intersection testing result, or in the absence of a primitive (or surface) intersected, a default shader can be selected. The default shader can be a scene-wide default shader, or it can be selected based on a type of ray associated with the intersection testing result. Ray type information as well as other data (e.g., references to other rays, code, and pointers to code to be executed), can be associated with the ray via the emit ray call.

Another aspect comprises a shading interface method, comprising accepting data from a first shader comprising an origin and a direction for a ray to be intersection tested in a 3-D scene. The method also comprises accepting, from the first shader, additional data to associate with the ray, and causing the additional data to be communicated to a second shader that is identified based on results of intersection testing the ray. The results of intersection testing the ray can comprise an identification of a primitive intersected by the ray, which is associated with the second shader. Code for the second shader can be operable to interpret the additional data to modify behavior of the second shader with respect to light emitted, reflected, or refracted by it. The second shader can write directly to a buffer location in closing state for the second shader.

In another aspect, a ray tracing method comprises defining a first ray for intersection testing in a 3-D scene composed of objects, and associating the first ray with a buffer location. The method also comprises testing the first ray for intersection in the scene to determine either (1) a closest object intersection or (2) that no intersection exists. The method comprises closing state for the first ray, depending on whether (1) or (2) is determined. If (1) is determined, then state is closed by running a first shader determined based on the object intersection. The first shader is programmed to use one or more of a first programming semantic for causing intersection testing of a child ray and a second programming semantic for use during shader execution that causes data contribution directly to the buffer location.

In the above example method, if (2) is determined, then state can be closed by running a default shader. The default shader can be determined from scene-wide default shader information. The default shader also can be determined based on ray type data associated with the first ray; the ray type data can be an enumerated set of ray types, with a respective default shader associated with each of the enumerated ray types.

Arbitrary data also can be accepted through the first programming semantic, for provision to a second shader identified based on the object intersection. In some examples, the second shader can be associated with the object intersected. The arbitrary data also can be provided to the default shader, if selected for execution.

In a more particular example, when a closest object intersection is a luminaire, the closing can include contributing color data to a buffer location through the second programming semantic. A value contributed to the buffer location can be determined by a color vector associated with the ray, and on a color of light emitted from the luminaire. The color vector also can be split among a plurality of child rays from a first ray by a shader using an emit ray semantic (first programming semantic, above).

In another aspect, a system for use in ray tracing comprises a shader execution environment, which comprises a computing resource configured with computer executable instructions to provide an interface for shaders during their execution. The interface comprises a ray emission call for use by shaders to specify respective origins and directions for one or more rays to be intersected tested, and one or more data elements additional to the origin and direction information. The system also comprises a memory resource interfaced with the shader execution environment to receive and store the origin and direction information and the one or more data elements. The shader execution environment is interfaced with an output of an intersection testing resource, which provides indications of intersection testing results of rays that have completed intersection testing, and is configured to identify a respective shader module for handling the shading of each ray intersection indication.

The shader execution environment can be further configured for accepting pixel color contributions through a contribution call made available to shaders during their execution, the shader execution environment further interfaced with a buffer comprising a plurality of locations for storing the accepted pixel contributions in one or more of identified locations in the buffer.

A further aspect comprises a method of converting recursive shader code to non-recursive shader code. The method comprises identifying, in code for a recursive shader, code descriptive of one or more canonical patterns to implement one or more effects. The method also comprises producing a non-recursive shader by mapping the identified canonical patterns to one or more non-recursive shader code patterns that collectively would execute to result in one or more equivalent effects.

The canonical patterns of the recursive shader may comprise a trace ray function call, which defines a ray to be intersected tested, and for which one or more downstream shaders will be called, and for which the recursive shader receives a color value returned upon completion of the downstream shaders. The recursive shader also may comprise code for performing operations on the received color, and code for returning an output color to complete the recursive shader.

The mapping of such a canonical pattern can comprise mapping the trace ray function call to a ray emission call that emits a new ray associated with state allowing processing of the ray to complete without returning a value to the non-recursive shader, and a contribution call that allows the non-recursive shader to contribute color to a specified buffer location.

Another aspect comprises a tangible computer readable medium storing computer executable instructions for configuring a processor, comprising: computer executable instructions for implementing a shader run time environment to which ray shaders can be written to implement effects, the run time environment providing a ray emission call through which the run time environment accepts rays to be intersection tested in a 3-D scene, and a contribution call through which the run time environment accepts data to be contributed to a buffer location that contains data which will be used in determining a color of at least one element of a representation of the 3-D scene.

A further aspect relates to a query-resolver system, which comprises a memory storing a dataset comprising a plurality of elements, each of the elements defined by values for up to n variables, n>=3. The system also comprises a system interface exposing a query emit interface for accepting a query defined by parameters and a solution contribute interface for accepting, from executing code modules, results to be written to a buffer. The system also comprises a processor configured with program code for accessing the memory to resolve the query by locating one or more of the elements that meet parameters defined by the query, and upon locating at least one element meeting the parameters, for executing one or more executable code modules selected based on one or more of data provided with the query and data associated with that element, and to use the system interface for accepting, through the query emit interface, from one or more of the executing code modules, one or more of a further query to be resolved, and through the solution contribute interface, a result to be written to the buffer.

A further aspect comprises tangible computer readable media, storing computer readable instructions and data comprising a plurality of code modules and computer executable code for implementing a method for selecting code modules to be executed, and providing inputs for their execution. The method comprises querying, with queries, a database comprising a plurality of entries. Each of the entries can be specified by respective values for a plurality of parameters, each entry associated with at least one of the code modules. Each query comprises a specification that is resolvable into respective ranges of the values of each of the parameters that meet that specification, and additional to the query specification, at least one additional data item to be received as input by one or more to-be-identified code modules. The method also comprises resolving each query to one or more entries of the database that meet that query's specification. The method also comprise identifying, for that query, one or more code modules associated with those one or more entries, and providing, from that query, the at least one additional data item as input to those one or more code modules.

More generally, certain aspects relate to scheduling code modules for execution and co-locating data that will be executed by such code modules to a processing resource that will perform the execution. In one example, an application may be comprised of a plurality of code modules, which all can accept an input and produce an output. The application executes with access to a memory storing a dataset comprising a plurality of elements. In order to accomplish a task, the application emits a query with specified parameters, which are used to search the dataset to identify one or more elements that satisfy the query (no elements may satisfy the query, but that possibility is separately considered). The pairing of the identified element and the query causes a selected one or more of the code modules to execute. The selection is accomplished by providing code for execution with the query itself and/or by pre-determined association with the element. During execution of the code module(s), the code module(s) can emit further queries and make a contribution to a result buffer, using a programming interface provided through a run time environment. Upon implementing these externally (external to the code module itself) visible changes, the code module can complete.

By contrast, a multi-threaded environment typically would have a thread executing for a code module that can call a number of functions, and the thread executing the code module would stall waiting for the function call to complete and return a value. In such an environment, an ultimate result is returned by the code module, after all the functions it calls complete and return, and it finishes processing. By contrast, in the present aspect, a given code module can complete and allow its state to be overwritten even while a number of queries or further processing it initiated has not yet completed.

Any method aspect can be embodied by computer executable code stored on one or more media. Further, any processor or other resource for executing such code, unless specified otherwise, can be composed of a plurality of independent computation units, multithreaded cores, FPGAs, ASICS, a mixture of special purpose and general purpose computation, and systems on chips.

BRIEF DESCRIPTION OF THE DRAWINGS

FIG. 4 illustrates a system implementing a programming semantic for communication between shaders and other resources in non-recursive ray tracing implementations;

FIG. 5 illustrates a data structure defining a ray, which may be used in the system of FIG. 4;

FIGS. 6-9 illustrate memory state relating to shading aspects of non-recursive ray tracing;

FIG. 14 illustrates aspects relating to determining a ray data structure for passing additional data elements between shaders submitted during a scene build process;

DETAILED DESCRIPTION

Figures 1, 2, 3:
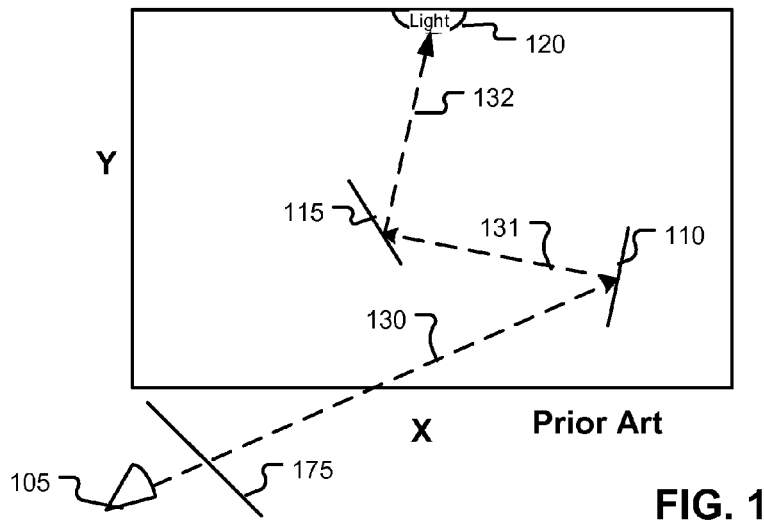
FIG. 1 illustrates a scene that can be rendered with ray tracing, and used for describing aspects disclosed herein.
FIG. 2 illustrates aspects of memory state of a background recursively ray tracing implementation.
FIG. 3 illustrates further aspects of memory state of the background recursively ray tracing implementation.
Figure 10:
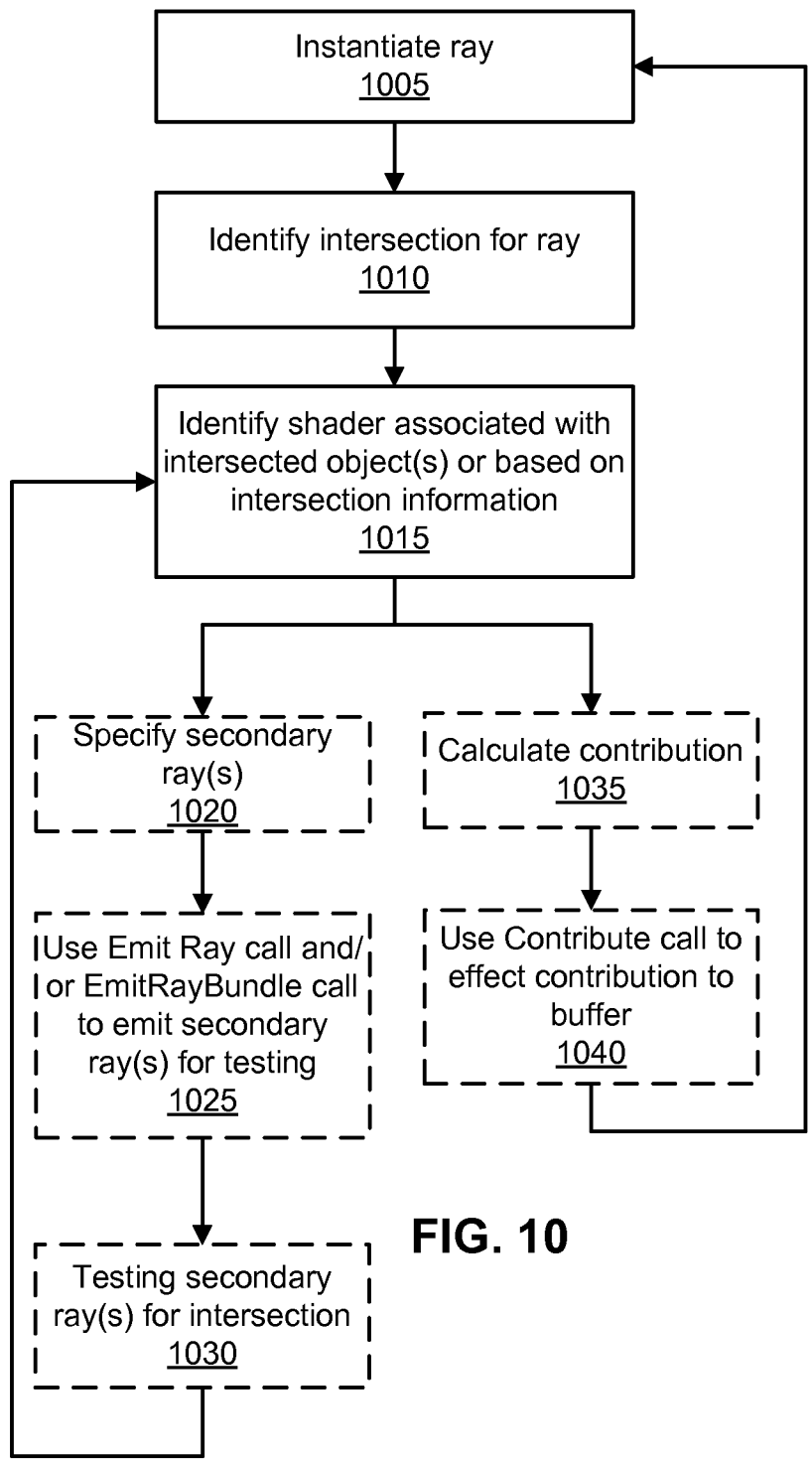
FIG. 10 illustrates an example method related to shader behavior in non-recursive ray tracing.

The following primarily relates to using ray tracing as a mechanism to render 2-D representations of 3-D scenes. The 3-D scenes to be rendered often are created (specified) by artists who are designing content, such as a video game, a motion picture, an animated advertisement, industrial models, architectural features, such as buildings, and so on. An artist can be a person, or a person using authoring tools, or even can itself be primarily driven by software. To produce content descriptive of a 3-D scene, an artist contends with a number of challenges. For one thing, an artist describes the physical boundaries (surfaces) of the scene and the objects in it. The description of such physical boundaries can be detailed. For example, a useful model of a car being designed using Computer Aided Design (CAD) requires precise specification of the components of the car as well as their spatial relation to each other.

The artist also describes how the surfaces of the scene objects should look and behave. For example, an accurate model of the car would represent window glass differently from a headlight glass, differently from a painted surface. For example, in a video game, the artist would model a skin surface differently from a hair surface, and so on.

Thus, one construct employed in the field of rendering is to provide a physical scene model, and associate surface information with different parts of the scene model. For example, a scene model can contain objects including a person, an automobile, and a building. The physical model of the scene would describe the surfaces of these objects, for example, as a wire frame model, which can include a large number of primitive shapes interconnected with each other to describe boundaries of the surfaces. This physical model generally lacks information about the visual appearance of the objects' surfaces. Then, information and programming is associated with particular surfaces, and/or portions of particular surfaces that describe their appearance. Such information can include textures for the surfaces, while programming associated with the surfaces often is intended to model what effect the surface has on light hitting the surface. For example, programming allows modeling of glass, a shiny surface, a bumpy surface and so on. Such programming and information thus is bound or otherwise associated with portions of the physical model descriptive of those surfaces. For example, programming can be associated with or bound to a particular primitive. Such programming and other description, or portions thereof, for a particular primitive or scene object can be referred to generally as a "shader" for that primitive or object.

3-D modeling and producing 2-D representations of such models is a complex endeavor. Artists generally care more about the ultimate product of the rendering cycle, and would rather abstract the technology involved in arriving at that product. Therefore, it is desirable to provide an interface that helps abstract some of the technical nuances of the rendering, but yet that interface still needs to enable the artist's expression, allowing the artist's desired effects and results to be achieved.

One way that such abstraction can be furthered is through provision of an Application Programming Interface (API) that allows the artist to upload, to a renderer, data descriptive of the physical scene model, and shaders to be associated with particular parts of the model. Then, the renderer can compile that data, and start working on producing output based on the scene model and the shaders.

Generically, the renderer determines a color for each pixel of the 2-D representation specified by the artist (during scene setup) and outputs those pixels as a rendering product. Different renderers can determine these pixel colors in different ways.

In rasterization, a renderer would first perform a visibility analysis to determine a single point on each scene object, or scene background for each 2-D screen pixel in the rendering output. A shader for that single point is then run to determine what color the screen pixel should be. In contrast, ray tracing operates by issuing rays through pixels of the 2-D screen, and when those rays hit scene objects, shaders associated with those objects can perform a wide variety of actions, including issuing many more rays that will be intersection tested in the scene. Each such ray can intersect further objects, causing further shaders to execute, and so on.

As such, the following disclosure relates to provision of an interface (e.g., an API) between an artist (generically, a source of scene data) and a collection of computation resources that are configured to perform rendering using ray tracing, based on a scene description (physical model and shaders) provided by the artist.

Still further, this disclosure relates to provision of an API that is intended for use with a non-recursive ray tracing renderer. In addition to providing a mechanism for uploading scene geometry and shaders, the shaders themselves can be programmed or specified to use calls defined by the API, as explained below. To explain aspects of an API for a non-recursive ray tracing renderer better, FIGS. 1-3 are first set forth to explain how an API for a recursive ray tracing renderer typically would work.

As described above, a recursive ray tracing algorithm maintains state for levels of a tree of rays from the camera ray to one or more ray that ultimately hit light source(s). Then, the effect of that light source is propagated back up that tree to determine a contribution of that light source to a color of the pixel which the camera ray at the top of the tree traversed. Similarly, if there were other rays related to the original camera ray that ultimately hit light sources, respective contributions of these other rays also would be propagated up respective branches of the tree for the pixel color.

FIG. 1 provides an example toy scene 100 comprising a first mirror 110, a second mirror 115, and a light 120. A camera 105 sends a ray 130 for testing into the scene. Ray 130 passes through a 2-D image plane 175, which is comprised of pixels, and is to be rendered from scene 100. A pixel of the image plane 175 is associated with ray 130 (e.g., ray 130 can be viewed as passing through one of the pixels of plane 175). Ray 130 is tested for intersection against objects composing the scene until it is determined to intersect with mirror 110 (i.e., a closest intersection of ray 130 and an object in the scene is with mirror 110.)

Mirror 110 is associated with a shader describing its behavior. Such a shader can be a collection of computer instructions that are executed to implement/describe behavior. For example, a simple mirror reflects all light hitting it according to Snell's law and a shader can describe such behavior. Since tracing occurs from camera towards a light, rather than vice versa, producing mirror-like behavior would require issuing another ray to determine what light is hitting the intersection point at reflection angle determined by an incident direction of ray 130 on mirror 110. Thus, a shader for a mirror would model that physical behavior with instructions to be executed and associated data to be accessed when needed.

In a recursive ray tracing scheme, a shader can cause emission of a ray by calling a "Trace Ray" function call, which ultimately returns a color value. Because the algorithm is recursive, the color value for a particular call of the function is not filled in until other, later, calls to the Trace Ray function call complete, such that data is then available to formulate the next color value to be fed up the tree, and so on. Table 1, below, shows some pseudocode for a mirror shader (i.e., a shader for an object with a mirror surface) in recursive ray tracing. Table 2 shows some pseudocode for a luminaire that may be used with the mirror shader of Table 1. The call to Trace Ray in Table 1 is a reference to code that operates to identify an intersection for the object, and which ultimately results in a shader associated with the object (e.g., a mirror Shader) being executed (or "called").

TABLE 1

Mirror Shader

| Code | Comment |
| --- | --- |
| Mirror Shader main (input_ray) { | Mirror Shader is called because the ray defined by the parameter input_ray intersected a primitive associated with the Mirror Shader |
| ray [origin, direction]=reflect (input_ray); | Functional call reflect receives the ray definition data input_ray and produces a new ray defined according to mirror-like behavior (e.g., reflection). The ray is defined by an origin and a direction, specified in 3-D space. |
| Color = Trace Ray (Ray Origin, Ray Direction) * Operations; | Calls the tracing function for intersection testing the reflection ray, and which returns a color value, when it completes. Mirror Shader also can perform Operations on the Color returned in the Trace Ray call to modify the color that it returns. |
| ... Other Operations ... | A variety of other computation can be performed before returning a final Color. Note that these operations are performed after return of a color value from other, later instantiated, shaders. |
| return Color.} | |

Thus, in this example, ray 131 would be spawned, and intersection tested until determining a closest intersection (here, with mirror 115). A shader for mirror 115 would then be called (could be the same shader code as for mirror 110).

Shader 115 would issue ray 132, which when intersection tested, is determined to intersect light 120.

Light 120 can itself be associated with a shader. For example, Table 2, below, illustrates a brief example of a shader for a light. In this example, the shader returns a color for the light emitted by the shader (i.e., shaders for luminaires model generation of light energy, the effect of which is being determined using ray tracing, in contrast to emission of rays, which comprehends instantiating rays to be tested.) In portions of this disclosure, the concept that a shader program can model light emissivity of an object is referred to as emitting light, and it would be understood that such verbiage does not refer to physical light emission, although the shader can model physical light emission.

TABLE 2

Light Shader

| Code | Comment |
|---|---|
| Light Shader main { color = Color of this light; | A value for the variable color is filled in by the light shader. For example, the light can be blue, or a combination of colors |
| return color.} | The light shader completes by returning the color value. |

FIG. 2 illustrates an example memory state for a recursive scheme for tracing the example situation of FIG. 1. FIG. 2 shows that a first column of program state, and a second column for data to be returned by each portion of program state. A "main" program, or some equivalent, issues ray 130 to be tested. This "main" program can track the pixel to which color information resulting from ray tracing may contribute, and the main program may do a variety of other manipulations, such as blending and filtering before a final pixel value is determined. Since such color information is not available when ray 130 is issued, state is maintained, often in a last in first out queue (often called a stack). Arrow 205 illustrates that intersection testing of ray 130 causes instantiation of mirror shader instance 1 (for mirror 110), mirror shader instance 1 requires testing of ray 131, which as shown by arrow 206 causes instantiation of mirror shader instance 2. Both mirror shader instances 1 and 2 remain waiting for color values. Finally, as shown by arrow 207, tracing of ray 132 causes instantiation of light shader instance 1, which can return a color of light.

FIG. 3 illustrates how the chain of outstanding shader instances can be closed. Arrow 327 illustrates that color from light shader instance 1 is provided to mirror shader instance 2, which can use that color to determine a color returned (arrow 326) to mirror shader instance 1, which in turn can use that color to determine a color to return (arrow 325) to the main program, which can use the returned color to determine a pixel color. After each shader returns its respective color value, it can complete.

So, programming to this paradigm generally provides for recursively calling a ray tracing function that returns a color, and each time the function is recursively entered, state is maintained for that instance of the function. As colors are returned, the state of the functions can be rolled up until the color of the original camera ray has been determined. Thus, a programmer interacts with such a system by allowing recursive trace ray function calls from shaders until closure of the sequence of rays can commence.

In view of this explanation of a recursive ray shading API approach, aspects of a non-recursive rendering API can be described more easily.

FIG. 4 illustrates an example system 400 that provides non-recursive ray tracing functionality, in accordance with the explanation below. System 400 comprises an intersection testing resource 402, and a 2-D scene buffer 450 for storing color information for a 2-D scene representation being rendered. System 400 also comprises a plurality of shaders 410a-410n, any selection of one or more of shaders 410a-410n can be executed in shading resources 404. The shading and intersection testing resources 404 and 402 can be any combination of hardware and software performing the identified functions, and can include, for example, code executing in threads of a multithreaded processor, or a plurality of processors, and so on.

Intersection testing resources 402 accesses data describing rays to be intersection tested 405, data 403 describing primitives composing a 3-D scene being rendered into the 2-D representation, and acceleration structures that can help accelerate such intersection testing. Shading 404 can also access primitive storage 403 (typically, does not require access to acceleration structures), accesses ray shading data 407, which can store data and code for supporting ray shading, such as texture data, and algorithms that can be used by a variety of shaders, such as algorithms modeling physical effects of various sorts. Shading 404 can receive indications of ray/primitive intersections from intersection testing 402.

Shading 404 (i.e., any of shaders 410a-410n) communicates with the 2-D scene buffer 450 and to intersection testing 402 through a programming semantic 460, to which shaders 410a-410n are written, as explained below.

System 400 can operate using rays defined with data structures, such as those illustrated in FIG. 5. FIG. 5 illustrates ray data structure 500 that includes a ray identifier 505, ray definition data comprising, examples of which include a ray origin 506 and a ray direction 507, an attenuation vector 508, a pixel 509, and a field for additional data 510, which can be included for a number of reasons, and be interpreted in a variety of ways, as described below.

To illustrate some differences between recursive and non-recursive ray tracing, examples of memory state for tracing the scene of FIG. 1 are shown in FIGS. 6-9, and contrasted with FIGS. 2-3. A camera shader (e.g., code issuing rays that are to be traced from a point of view into the scene) issues camera ray 130 (FIG. 1) with a ray origin 506, a direction 507, an initialized attenuation vector 508, associated with a particular pixel 509 of a 2-D representation; additional data field 510 may be filled in. After issuance of ray 130, camera shader can complete. Ray tracing proceeds to identify mirror 110, resulting in establishing instance 1 of the mirror shader, and to instance 1, the pixel 509, attenuation vector 508, and additional data 510, if present, are passed (e.g., by connection between intersection testing 402 and shading 404 of FIG. 4). Instance 1 of the mirror shader also may receive barycentric coordinates for where the ray intersected the mirror, and/or other ray information, such as origin 506 and direction 507. In aspects according to this description, an attenuation vector is not a necessary component, but is used for sake of illustration.

Mirror shader instance 1 can create a reflection ray (ray 131) to be intersection tested, with a respective origin, and direction. The reflection ray also is associated with the pixel from the incoming ray (ray 130), and with an attenuation vector based on the attenuation vector of the incoming ray (ray 130), and with any additional data 510 provided with the incoming ray. After creating the reflection ray, instance 1 can be considered complete, and it can exit.

Ray 131 is tested to intersection with mirror 115, and instance 2 of the mirror shader can then receive the attenuation vector, pixel and additional data from ray 131, produce a modified attenuation vector, and create a reflection ray (ray 132) with an appropriate origin and direction for testing. Instance 2 of mirror shader can exit after creating ray 132. Ray 132 is intersection tested, and light 120 is identified as being intersected. A light shader is instantiated, and receives the pixel, attenuation vector, and additional data (if any) from ray 132. The light shader determines light energy to be contributed to the pixel, based on qualities of light 120, the attenuation vector provided to it, and the additional data, if present. The light shader contributes this light energy directly to scene buffer 450.

The attenuation vectors used in such non-recursive ray tracing allow any contribution each shader has to a pixel to be reflected in the attenuation vector in an "outbound" direction, rather than modifying an actual color value returned during closure as explained with respect to FIGS. 2 and 3. Then, the light shader can use the attenuation vector received by it, which encompasses effects of intermediate shaders, and its own code to determine light energy to contribute to buffer 450, without there being transfer of light energy among all previously instantiated shaders.

An attenuation vector also can relate to an importance of a ray to a pixel associated with that ray. For example, if 10 rays will be issued by a frame shader (e.g., a shader operating also as a camera to emit rays from an image plane into the 3-D scene) according to this description (see e.g., FIG. 12), then those rays each can have their attenuation vectors initialized to represent that one tenth of the light energy for that pixel may come from each of the rays. Alternatively, some of the rays can be assigned greater relative weights by their respective attenuation vectors, meaning that those rays can more strongly affect a final pixel color. Shaders can implement operations relating to using or determining/setting such importance during shading.

The above example was simplified in a variety of ways. For example, shaders may modify an attenuation vector during execution for a variety of reasons. For example, an object can be assigned properties that attenuate certain wavelengths of light more than others, e.g., the object simply can have a color, which implies that it absorbs certain light frequencies. By contrast, a perfect mirror may not need to modify an attenuation vector, meaning that it perfectly reflects all light received by it.

Another simplification is that each shader either issued rays for intersection testing (the mirrors), or contributed light energy (the light). However, some shaders may both issue new rays and contribute light energy. For example, an object can glow and also reflect light from other sources.

Another way to describe usage of programming interfaces according to these examples is that a shader written to the programming interface can make calls to it (e.g., the emit and contribute calls) while the shader is executing. By contrast, results of typical shaders are propagated after shader completion. By way of further explanation, in a recursive shader, a background process can communicate a value from a shader that has completed to a shader that invoked the now-completed shader, but for purposes of this description, that background process is not communicating that value during executed of the completed shader. By contrast, a programming semantic according to these disclosures can implement one or more processes that can be called to effect outputs at any time during shader execution (even if other background processes also are implemented after shader completion).

Now returning to FIG. 4, programming semantic 460 provides a first call to be used to issue new rays and a second call to contribute light energy to buffer 450 for an identified pixel. An example of such a first call is shown used in Table 3, below, where "Emit Ray" accepts a definition of a ray, and would cause that ray to be intersection tested. In these discussions, such intersection testing can be according to any means for determining a primitive intersected by a ray; many such means exist. After the ray is emitted, that instance of the shader can complete, as discussed above.

TABLE 3

Mirror Shader - Non-recursive

| Code | Comment |
|---|---|
| Mirror Shader main (input_ray) { ray [origin, direction]=reflect (input_ray); | Mirror Shader is called because the ray defined by the parameter input_ray intersected a primitive associated with the Mirror Shader Functional call reflect receives the ray definition data input_ray and produces a new ray defined according to mirror-like behavior (e.g., reflection). The ray is defined by an origin and a direction, specified in 3-D space. |
| ray.attenuation = [1.0, 1.0, 1.0]; | Sets attenuation vector for outgoing ray. |
| Emit Ray (ray); | Use first call to submit ray for intersection testing. |
| end.} | Shader ends after emitting ray(s). |

An example of a second call of programming semantic 460 is in Table 4, which illustrates example code for a shader for light 120. Here, the shader receives an input ray ("input_ray") which intersected the light. The shader determines a contribution based on an attenuation vector from the input ray, and based on any of a variety of characteristics of the light, as well as additional data (510 of FIG. 5), if any, and as desired. Then, the shader can use the "Contribute Color" color, supplying the pixel, and the contribution. In other examples, the pixel can be implied, if for example, there is other code or state maintaining a relationship between this particular shader and the pixel.

TABLE 4

Light Shader - Non-recursive

| Code | Comment |
|---|---|
| Light Shader main (input_ray){ contribution = Light Characteristics * input_ray.attenuation; Contribute Color (input_ray.pixel, contribution); end.} | A value for the variable color is filled in by the light shader. For example, the light can be blue, or a combination of colors Use second call to effect contribution of light energy to pixel. The light shader completes by returning the color value. |

A further call that can be provided in an API according to this disclosure is a call allowing emission of a bundle of rays all sharing at least one characteristic or similarity. For convenience, such a call can be named "EmitRayBundle" and can accept data defining or from which can be derived an origin and direction for each ray, data defining attributes shared among the rays of the bundle, data defining attributes unique to each ray, as well as shared or unique parameters for each ray.

For example, the EmitRayBundle call can accept a weighting factor ("weight") to be attributed to each ray of the bundle. In one example, the weight can be expressed as a number that will be divided among the rays of the bundle by computing code implementing the EmitRayBundle call (e.g., by simple division). In other examples, the weight is attributed without modification to each ray.

In some implementations, the EmitRayBundle call allows specification of a number of default parameters and/or attributes that will be attributed to each ray in the bundle, unless a specific overriding parameter/attribute is provided for that ray. For example, an implementation can accept a common origin for a 10-ray bundle, 10 separate directions, and a weight to be applied to each (e.g., 0.1). In that implementation, programming to configure a processing resource to further accept weights to override weights for certain rays can be provided. For example, after an origin for each ray, a weight can be provided, and if none is provided, then the default weight is applied to that ray.

A bundle of rays submitted to a renderer (e.g., from a shader) using the EmitRayBundle call can be processed and data pertaining to those rays can be stored in memory based on how the bundle was specified. For example, separate origin and direction data defining rays of the bundle can be stored in memory, and attributes, parameters, attenuation vectors, and/or weights shared in common for the rays can be stored once and referenced for all rays of the bundle. Where rays of the bundle share an origin or a direction, that shared definitional information can be represented in memory by data shared among rays of the bundle.

Where some rays have different weights or other parameters than other rays of the same bundle, the renderer, when storing data for those rays, and/or shading each ray in response to an identified intersection, can treat those exception rays independently, or as though they were not specified in the bundle. For example, all parameters for such a ray can be separately duplicated in a memory space for definition data for the ray, even while other rays in a bundle can be stored with shared parameter information.

As with the Emit call described above, the EmitRayBundle call can also allow any arbitrary additional data to be specified for rays of the bundle (again, using a common parameter/exception approach, if desired). That additional data can be provided to a future shader that is identified based on a ray of the bundle intersecting a primitive associated with that shader. That future shader can use the additional data in its processing or otherwise modify its behavior based on that additional data.

As such, it was described above, in several places, that additional data can be associated with a ray by a first shader using programming semantic 460 (and in this example, a call for causing ray emission can accept such additional data), and then one or more other shaders can receive that additional data. Each shader can receive the additional data and/or pass it to a subsequent shader identified based on association with a primitive intersected by a ray emitted from the previous shader (e.g., instance 2 of the mirror shader was associated with mirror 115 and was identified because ray 131 intersected mirror 115.)

The additional data can be user-defined and can be application-specific. For example, attenuation vector 508 can be implemented as such additional data (i.e., a ray origin and a ray direction are central to defining a ray, but data that may be used for implementing different ray tracing constructs can be made to vary herein among different applications).

One particular example to which this additional data can be put is during closure of a ray (e.g., by a shader terminating a particular line of rays by contributing light energy, or the like). For example, the additional data can be interpreted as code that can modify behavior of a shader using the Contribute Color( ) call to contribute color to buffer 450. For example, the additional data can be used in implementing a shadow catching plane, which is a technique that can be used for purposes such as integrating photographs or other "real-world" imaging into a computer graphics scene, such as with animation.

Another example is implementing a blending operation, where a final color resulting from the blending depends on a variable ratio between two textures to be combined. The two textures are identified based on intersection testing (i.e., respective rays were found to intersect objects associated with the textures). Shaders associated with those respective objects, in emitting further rays using the Emit Ray call included the texture information as additional data. Such texture information can include identification of each texture, or descriptive information. Ultimately, those rays hit an object associated with a shader that is operable to perform a blending operation. That shader can perform sampling to set the variable ratio, use it to blend the textures from the separate rays, and contribute the resulting blend.

As was disclosed above, an API call can be provided to allow a shader to directly contribute to a buffer (e.g., buffer 450). Such contribution, although prototypically additive, can also implement different functions in such contribution, including setting. Also, a buffer to which a contribute call may write can be an intermediate buffer used for any purpose, and not only a buffer storing color information directly relevant to a pixel color. Thus an accumulation buffer or to otherwise accumulate, encompasses capturing effects of write operations from usage of the contribute call available in the API.

FIGS. 6-9, introduced above, illustrate examples of memory state during non-recursive ray tracing. FIG. 6 illustrates that a camera shader emits ray 130, with an attenuation vector, pixel, and optional additional data. FIG. 7 illustrates that instance 1 of a mirror shader is loaded in response to intersection between ray 130 and mirror 110, and also illustrates that state need not be maintained for the camera shader. Mirror shader instance 1 forms an attenuation vector (Att. Vector') for ray 131, while the pixel and other data also are included. FIG. 8 illustrates similarly that intersection between ray 131 and mirror 115 causes instance 2 of the mirror shader, and that state for instance 1 need not be maintained.

Similarly also, instance 2 of provides an attenuation vector (Att. Vector") for ray 132, while pixel and additional data are passed on. FIG. 9 illustrates that the Att. Vector", pixel, and additional data from ray 132 is provided to light shader instance 1 in response to intersection between ray 132 and light 120. FIG. 9 also illustrates that instance 2 of the mirror shader need not be maintained. FIGS. 6-8 also would use programming semantic 460 for emission of the respectively identified rays (e.g., by the example "emit ray" call of Table 3, above. Light shader instance 1 produces a contribution to the pixel based on the Att. Vector", and uses programming semantic 460 to communicate the contribution to buffer 450, and in particular a contribution call, such as the "contribute color" call of Table 4, above.

In the above examples, each shader (camera, and two instances of a mirror shader) spawned a ray, either initially, or in response to an intersection. In many practical implementations, shaders would issue multiple rays; for example, the mirror shaders could each issue a number of rays to be tested. Each of these rays preferably may inherit the additional data, if any, from the ray which caused their issuance, as well as the propagation of attenuation vectors, and pixel associations. Each such ray can then initiate its own secondary rays, or exit the scene without intersection. Ultimately, all rays whose existence is due to a particular camera ray will either exit, or hit a light, or be culled. Closure for a total light energy attributed to the camera ray can be achieved through programming semantic 450 using a call allowing contribution to scene buffer 450.

An example method 1000, by way of summary for the above disclosure, includes instantiating 1005 a ray, and identifying 1010 an intersection for the ray. Method 1000 also comprises identifying 1015 a shader, based on the intersection for the ray. In one example, a primitive found to be intersected by the ray can be associated with the shader (or an object of which the primitive is a part). In other examples, where the intersection is with a background, a default shader can be identified. The default shader can be a default shader for all rays, or it can be a default shader for a group of rays, or a particular type of ray (e.g., a default shader for all shadow rays). Default shaders can be implied, such as for a single default shader for all rays, or for a particular type of ray. Shaders also can be specified as additional information provided with the ray type (e.g., as a pointer to code to be executed). The shader can specify 1020 secondary ray(s) for testing, and use 1025 an emit call to have those rays tested. These secondary rays can be tested 1030 for intersection, and method 1000 can continue at 1010. The shader also can calculate light energy to contribute to a pixel identified by the ray, and such light energy can be contributed 1040 to a buffer using a contribute call for a programming interface.

Figure 11:
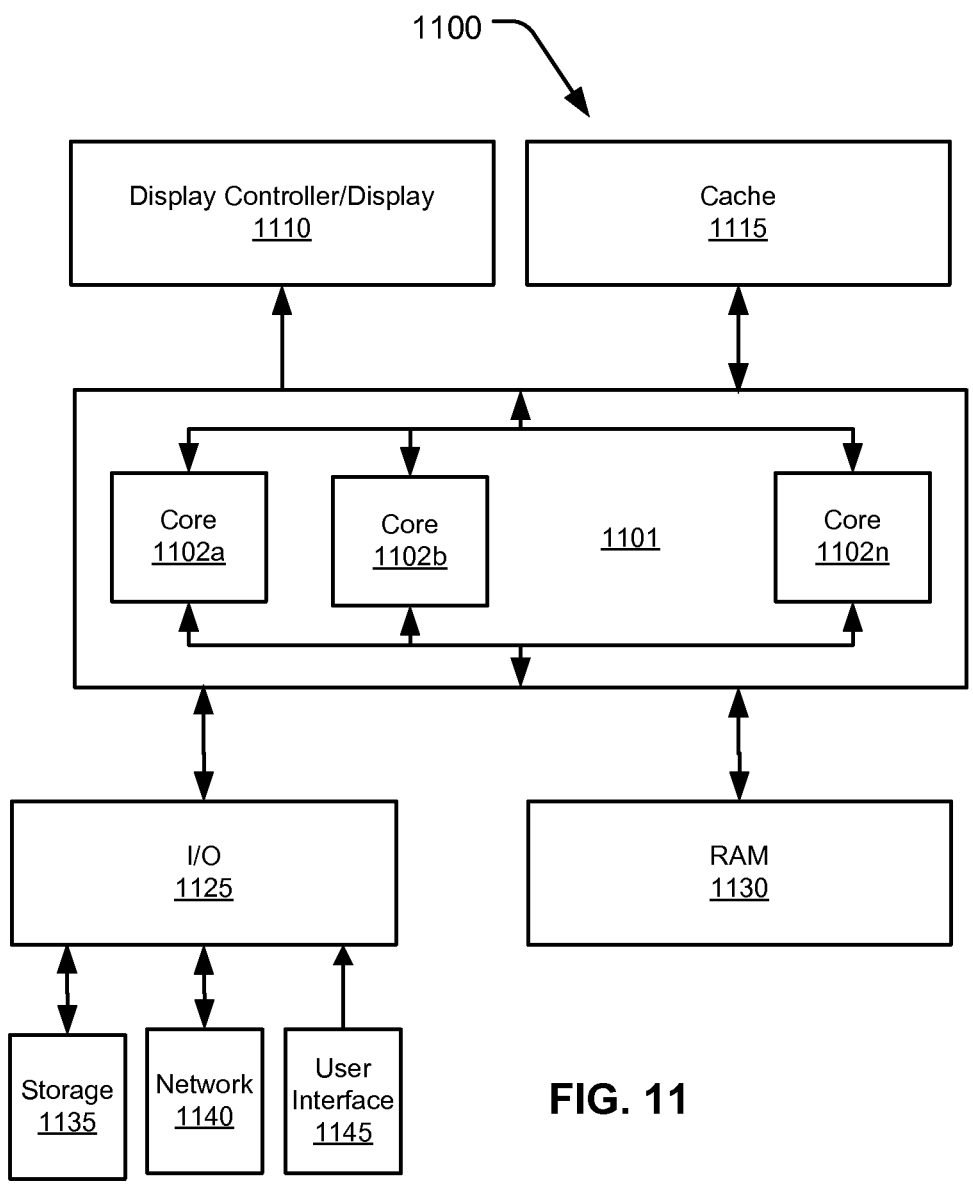
FIG. 11 illustrates components of a system that can be used in implementing the system of FIG. 4 and/or portions thereof.

FIG. 11 illustrates an example system 1100 that can be used to implement system 400 and/or components thereof. System 1100 comprises a computing resource comprising a plurality of cores 1102a-1102n, with each core being used to identify a plurality of logically and/or physically separate sub-units of computing resource 1101, which each can be used to execute operations that can be hard-coded and/or configured using code from computer readable media. For example, each core 1102a-1102n may be operable to concurrently execute multiple computing threads. Computing resource 101 is operable to communicate with a cache 1115, which represents one or more fast access memory components, and which can be assigned to respective core(s) from cores 1102a-1102n, shared, or some combination of assignment and sharing. Each of cores 1102a-1102n also can include their own private caches. An I/O interface 1125 provides access to non-volatile storage 1135, examples of which include one or more hard disk drives, a flash drive, DVD, or high-definition storage media. Interface 1125 also provides one or more network interfaces 1140, which can comprise, for example, Ethernet and 802.11 wireless networking capability, Bluetooth, and so on. Interface 1125 also provides access to a user interface 1145, which can comprise a mouse, keyboard, microphone, touch screen input, and so on. System 1100 also comprises a RAM 1130, which communicates with computing resource 101, and can be used for storing code and data used more frequently than code and data stored in storage 1135. System 1110 also comprises one or more of a display controller and display, collectively identified as 1110. In some cases, one or more of cores 1102a-1102n can be physically located on a graphics card having other display controller logic, and conversely, display control logic can be co-located with computing resource 1101.

In some cases, it may be preferable to store rays currently being tested for intersection in cache 1115, while fetching primitives for testing from RAM 1130 when required. Shaders can be stored in RAM 1130, along with texture data. Each core 1102a-1102n may be assigned to perform intersection testing or shading, or in some cases, may perform a combination of intersection and shading operations.

Programming semantic 460 (FIG. 4) can be stored in storage 1135, and loaded into RAM 1130 (or a combination of RAM 1130 and cache 1115) with a rendering application, such as a video game, a computer aided design or animation package, and so on. Programming semantic 460 also accesses code and/or hardware appropriate to the particular system implementation, to implement the ray emission and light contribution calls described above.

Figure 12:
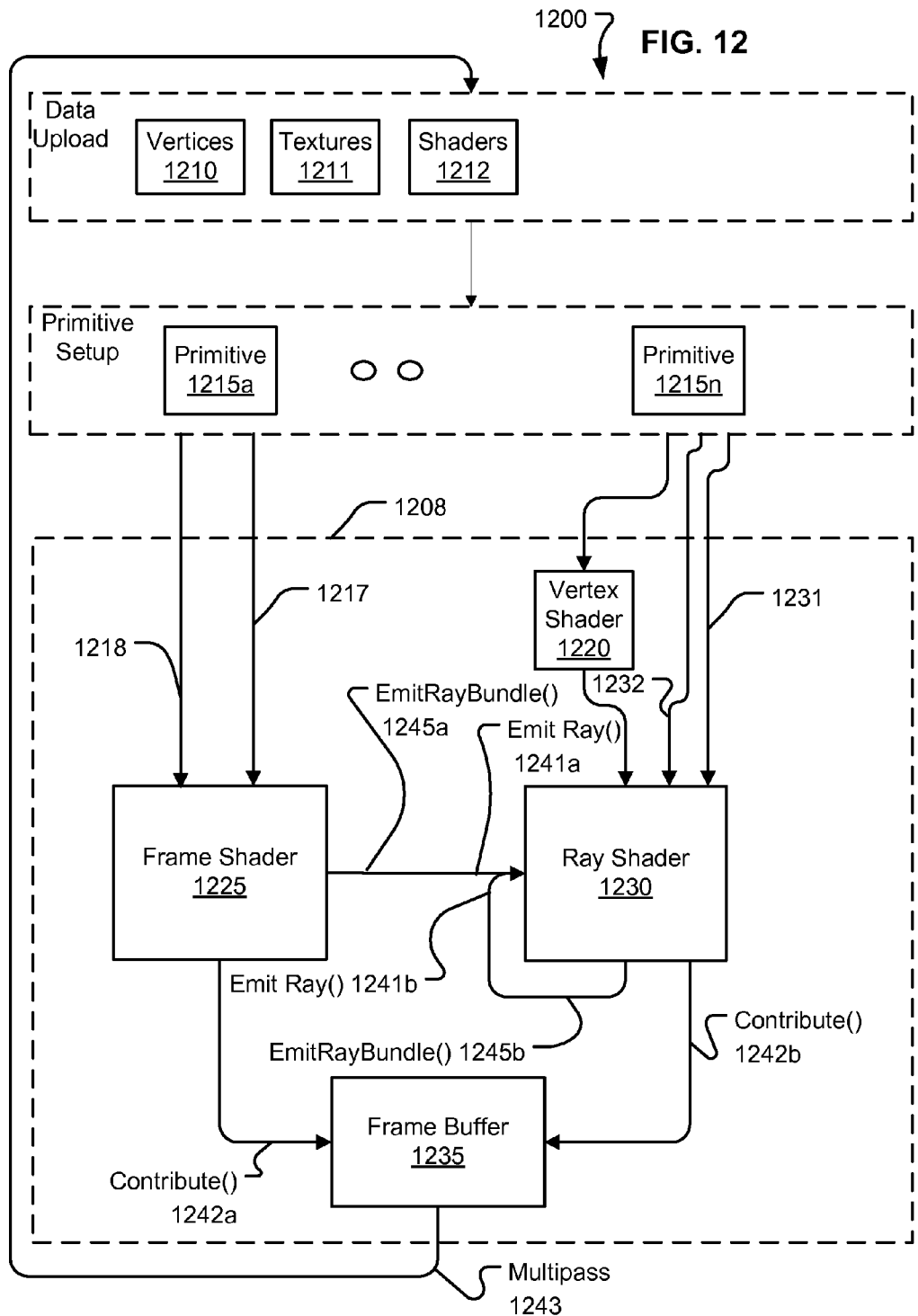
FIG. 12 illustrates a rendering flow in which described aspects can be employed.

FIG. 12 illustrates a programmer-centric view of a flow 1200 in which aspects described above can be embodied. Flow 1200 includes a data upload phase in which an application can upload vertices 1210, textures 1211, and shaders 1212 for rendering a scene to a renderer. A portion of the renderer can process this data to create primitives 1215a . . . 1215n. Primitives 1215a-1215n can be represented by triangle strips, for example, that were formed based on vertices 1210. Primitives 1215a-1215n also can be linked to one or more textures from textures 1211 and one or more shaders 1212. Shaders 1212 can be for a variety of different purposes. For example, some shaders can be for handling visible light effects while others can be for handling physics, geometry deformation, and so on. Thus, shaders for a given primitive can be linked to run consecutively, or only under certain conditions.

In any case, textures 1218 (can also be called texels) and shader code 1217 can be provided to a frame shader 1225. Frame shader 1225 can be run for each pixel of a 2-D representation to be rendered from a given 3-D scene. Frame shader 1225 can use inputs including textures 1218 and shader code 1217, which a programmer can use to supply data (generally through textures 1218) and code (through code 1217) that can be executed for use in performing such tasks as determining what rays to issue for a given pixel, whether certain filtering operations should be performed, or even applying a texture to a "lens" of a camera, such as condensation or dirt. Thus, frame shader 1225 can use both emit and contribute calls, respectively identified as Emit Ray( ) 1241a and Contribute( ) 1242a. Because flow 1200 is programmer centric, intersection testing occurring between Emit Ray( ) 1241a and ray shader 1230 is abstracted (i.e., intersection testing determines what object is intersected, and hence what shader will be run). In sum, a function of a camera in traditional ray tracing can be provided using a more generalized concept of a fully featured frame shader 1225, giving increased flexibility to a programmer as to how rays should be issued into a scene for testing, while also providing a useful abstraction of the rendering implementation.

Another aspect of flow 1200 is that a vertex shader 1220 can run to perform functions generally attributed to vertex shader as presently described in the literature. Ray shader 1230 also receives texture information 1231 and shader code 1232. Similar to frame shader 1225, shader 1230 uses that information in determining how to use an Emit Ray( ) 1241b call and a Contribute( ) 1242b call (i.e., calling the same respective functions as do calls 1241a and 1242a). Generally, ray shader 1230 represents an instance of shader code executed in response to an identified ray/primitive intersection, on associated texture data, and other data, as available, such other data including additional data passed through a ray data structure, provided by a potential prior shader, such as Frame Shader 1225.

Both Contribute( ) 1242a and 1242b calls can be used to cause contribution of color to a frame buffer 1235. Likewise, both Emit Ray 1241a and 1241b can be used to cause emission of rays for intersection testing. Thus, a unified programmer interface can be provided that can implement both camera functionality and shading functionality, both from a standpoint of rendering an entire frame (frame shader) and writing code for particular shaders that will be executed during rendering of a frame (e.g., different shaders for different materials in a scene).

As further shown, EmitRayBundle( ) call 1245a allows frame shader 1225 to emit ray bundles that will be intersection tested, and based on those intersection testing results, rays from that bundle will be shaded in ray shader 1230. Similarly, EmitRayBundle( ) call 1245b allows a shader being executed in response to an identified ray/primitive intersection to emit ray bundles, which will cause constituent rays in the bundle to be tested, and shading of identified intersections continued.

Multipass 1243 allows rendering to be implemented with multiple passes through an entirety of the flow 1200, with at least portions of a scene being rendered. For example, if a first pass through flow 1200 for some intersections resulted in execution of geometry morphing shaders (i.e., shaders that changed shapes of scene objects), then flow 1200 may be with those changes. Other multipass techniques can be for performing different passes for diffuse and specular lighting, or blending, for example.

Still further aspects in accordance with these disclosures can include analysis of shader code written for use with a recursive ray tracing methodology/renderer, and automatically converting that recursive shader code into shader code for non-recursive ray tracing. This automatic conversion can be useful in converting shader code written for use in recursive ray tracing renderings for use with a non-recursive ray tracing renderer. Conversion according to these examples can take into account a number of variations in such code, as explained below.

A programming model for recursive shading is to emit a ray for testing, wait for color results to be returned (called an "input color" in related description) for that emitted ray (can involve many subsequent shaders for child ray generations, as discussed above), perform some operations on that input color, and then return a color to finish shading (called an "output color" in related description). The operations performed by the shader on the input color can include operations such as adding or multiplying portions of the input color (which can be expressed for example as a vector of color components, such as primary colors red, yellow, blue, and so on).

Thus, a method translates shaders written to the recursive programming model to a non-recursive model by identifying these patterns and producing code that preserves the operations performed in those patterns in a non-recursive shader. Systems and computer readable media can be used in providing such identification, translation, and code production.

For example, a method for such translation can include identifying, in code for a given shader, (1) code causing emission of a ray to be tested and (2) code for performing operations on an input color returned by virtue of testing that ray. As described above, in recursive ray tracing, code for (1) generally is executed before code for (2). Shader code for implementing such shading non-recursively would then be created.

Because non-recursive ray tracing feeds information in a forward direction (e.g., color information), each shader executed gets its "input" color information in a form that tracks what effect a path will have on light that ultimately will be determined to travel that path. In other words, shaders get their color inputs while rays are still being traced towards light sources, in contrast with recursive shading wherein color inputs are received by shaders on a direction back to a camera, after identification of light sources and their light emissions.

Creating such non-recursive code thus can include producing code that performs operations equivalent to code for (2), above, on color information obtained from a ray whose intersection will cause the shader to be executed. Such input color information can include an attenuation vector, for example. Using an attenuation vector to represent transfer of color information, equivalent operations can produce a new or modified attenuation vector that represents an effect that the recursive shader would have had on the input color. Then, an emit ray call can be accessed, as described above, that provides the attenuation vector and ray definition data for a child ray to be tested.

Ultimately, recursive shading code generally causes a color to be defined and returned (i.e., a light has been hit, and so a color to be returned no longer depends on further ray testing). Such color definition code can be translated into a Contribute( ) color call that accepts color to be contributed to an identified pixel (e.g., a pixel associated with a ray that intersected an object associated with the shader).

Another feature that can be provided in a compiler that can translate a shader written for recursive ray tracing into a shader suitable for a non-recursive model is inferring or otherwise estimating computational resources that would be used by the shader in a non-recursive model, and in a particular example, what memory resources would be used for rays that would be emitted when the shader is executed. As described above, a sequence of shaders can be identified by testing a sequence of rays determined through intersection testing. Often, such a sequence is specified by each called shader using function calls that attempt to fill a color variable with results from a function call (e.g., a trace ray call). Thus, a shader at the end of such a sequence (at the end by virtue of not also emitting further rays for testing) may simply return a color value after some processing. Therefore, a compiler may be able to infer from such behavior or code that this shader will have a relatively small impact on a utilization of memory that stores emitted rays waiting to be intersection tested. The compiler may record such an inference or determination as a hint in a compiled shader. For example, the shader can add a function call that allows various parameters to be set, including a hint as to shader behavior, and in particular, behavior relating to ray emission.

Thus, in many cases, systems and methods for converting recursive shader code to non-recursive shader code would reverse an order of operations, such that calculations of shader effects are performed before it is known on what light energy, if any, those effects will ultimately operate.

In sum, any of the functions, features, and other logic described herein can be implemented with a variety of computing resources. A computing resource can be a thread, a core, a processor, a fixed function processing element, and the like. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

Figure 13A:
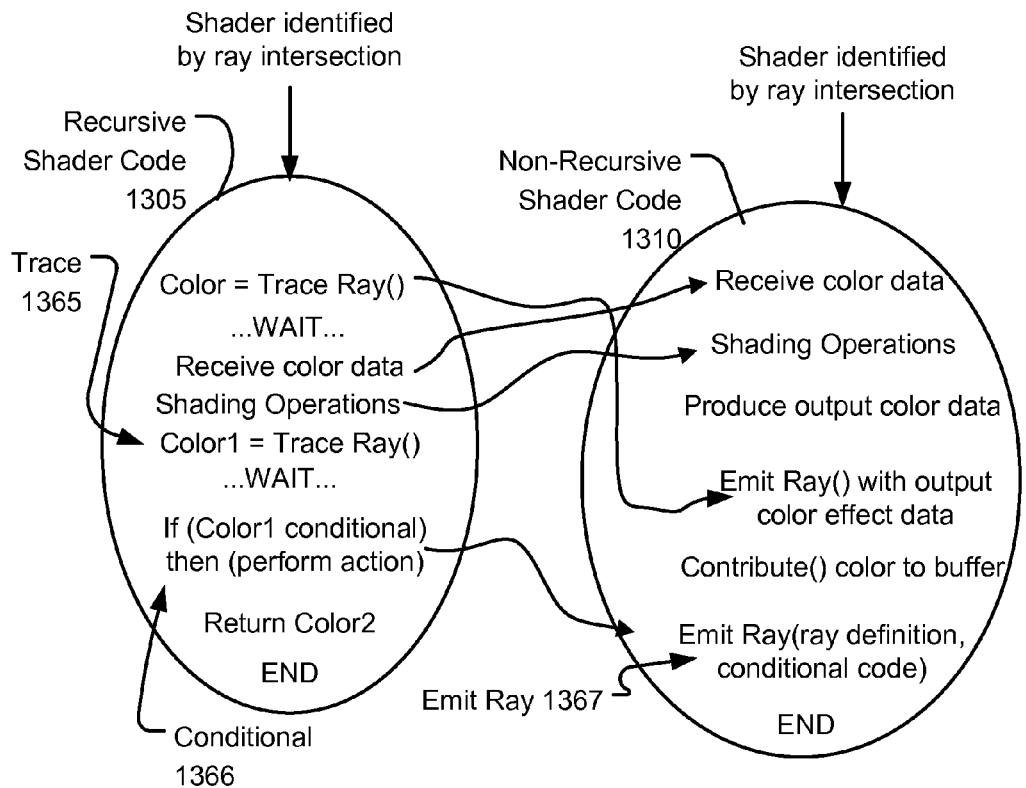
FIGS. 13A and 13B illustrate aspects of mapping recursive shading code to non-recursive shading code through automatic conversion processes.

FIG. 13A illustrates a conceptual mapping between recursive shader code 1305 and non-recursive shader code 1310. Both code 1305 and 1310 can be initiated in response to an identified ray/primitive intersection. Shader code 1305 includes Trace Ray( ) waiting for the tree of rays spawned by that trace to finish, which causes a color to be returned, performing shading operations on the color, and then returning a color, thus completing that level of the tree as well. These aspects can be mapped, for example, as shown in FIG. 13 to non-recursive code, such that color information is fed forward (other information according to this description as can be fed forward), shader operations are conducted on that forward-fed color information (and other information, as provided), output color information (and other information, as provided) is formed, and provided with an emit ray for reception by a subsequent shader. These shading operations also can result in contribution of color directly to a buffer.

Figure 13B:
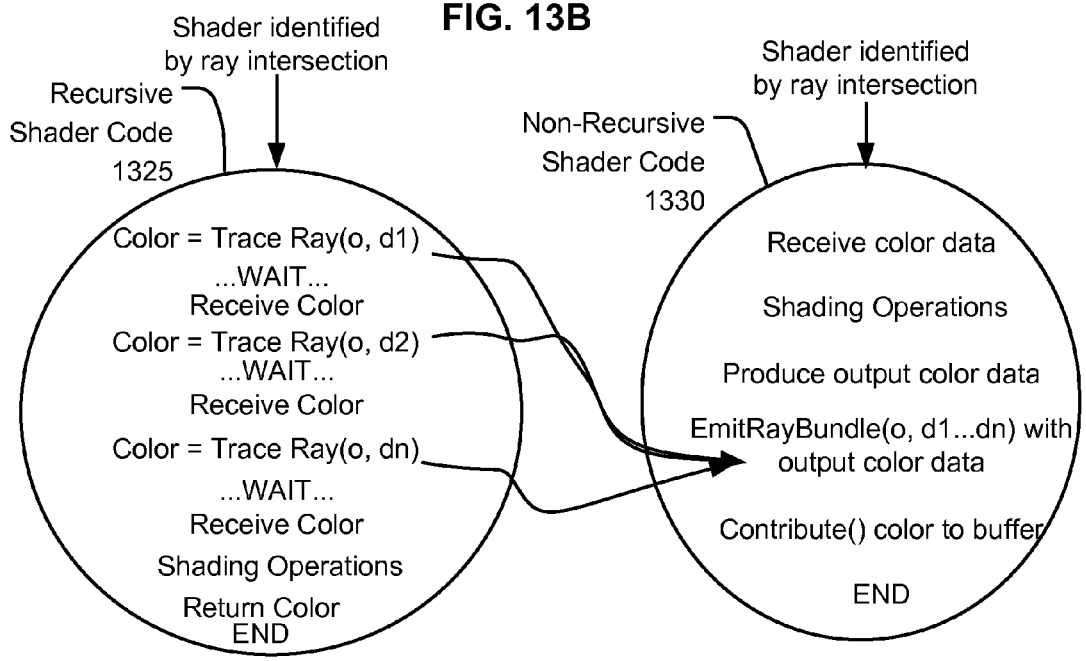

FIG. 13B illustrates another example of how a compiler may process a shader for an API according to present examples. In particular, recursive shader code 1325 illustrates several emit ray calls that specify a ray of an origin O, and different directions, D1 . . . Dn. A compiler can read this shader code 1325 and convert it into shader code 1330 that comprises an EmitRayBundle, wherein the origin remains specified, and each separate origin, which was part of a separate ray emit call can now be specified together as a sequence of directions. Code modules implementing the API can receive the emit ray bundle call and process the bundle either to produce separate ray data structures or to store the data defining the rays of this bundle in a memory, with the origin data shared among the rays.

Mapping of recursive to non-recursive can include identifying a variety of canonical forms of recursive shading code and mapping those recursive canonical forms to appropriate non-recursive shading code. FIG. 13A depicts one such example canonical form, where a trace ray call (trace 1365) is performed by recursive shader code 1305. Recursive shader code 1305 would wait to receive color1 in return, and upon receiving that color, it performs a conditional 1366, wherein an action is performed if a specified condition applies to color1. Here, color1 can be any value returned from the trace ray function, and can include occlusion information, for example. This canonical form can be represented using an API according to these disclosures by using the emit ray call (emit ray 1367) with an attached expression representative of the condition and code representative of the action to be performed, if the condition holds. Of note is that the condition would be tested and the action performed by a shader that is called for shading the emitted ray (or by code called by that shader), rather than in non-recursive shader 1310.

FIG. 14 illustrates aspects related to arranging a ray data structure when preparing to render a scene. Preparing to render a scene with a ray tracing renderer can involve submitting scene geometry (e.g., a wireframe model), textures to be mapped to portions of the geometry, scene definition data, such as a camera location, and shaders comprising code to be run in response to detected scene intersections. These data can be submitted to an API that can process the data in preparation for scene rendering. One aspect of processing according to these disclosures is to process appearances of additional data elements that are provided with calls to the Emit Ray( ) call described above. Each shader can have one or more such calls, and each such call can include one or more items of additional data. For example, FIG. 14 illustrates shader code 1405a that includes calculations using elements of additional data b.1, and b.2 (a notation to identify by letter which shader emits a ray with a given element of additional data, and an arbitrary numerical identifier to differentiate one item of additional data from another emitted by a given shader). Shader code 1405a also emits respective rays that include additional data elements a.1 through a.n (i.e., the general case of emission of n rays, each potentially having one or more items of additional data). Similarly, shader code 1405b performs various calculations using, in this example, additional items of data a.1 and a.2 and emits rays with additional items of data b.1 through b.n. Finally, shader code 1405n performs calculations with additional data elements c.1 through c.n, and calls Emit Ray( ) with additional data elements n.1 through n.n. Thus, FIG. 14 illustrates an example where an arbitrary number of shaders each can perform calculations with certain pieces of additional data when that additional data is made available to that shader by virtue of a ray intersecting a primitive associated with that shader. That shader also can emit rays having different additional data, or different values for the same type of additional data.

Scene builder 1450 inputs shaders 1405a-1405n, and identifies the additional data elements used by the collection of shaders. Scene builder 1450 creates a data structure 1475 (or at least an additional data field 1484 used to define a layout of the additional data elements used by the various shaders inputted to scene builder 1450) for rays that will be used to render the scene. As illustrated in FIG. 14, additional data field 1484 can have any arrangement of the additional data elements used by the inputted shaders. For example, additional data element b.1 can be located first, even if it is not a first element used by a given shader, or the first element of a first shader inputted. Instead, scene builder 1450 preferably attempts to optimize a structure of the additional data field 1484 (a ray identifier 1481, origin 1482 and direction 1483 were added for context). Such optimization can include, for example, packing bits for different additional data fields, aligning fields to boundaries, such as byte, or word boundaries, and so on. In other cases, a data structure for the ray or for the additional data field can be passed as information to scene builder 1450, in addition to the shaders (i.e., the ray data structure itself can be user-defined).

Thus, scene builder 1450 accepts shaders that may be called to run during intersection testing of a scene being rendered. The shaders can pass data to each other through the Emit Ray( ) call, which can accept elements of additional data as arguments, or a ray data structure with such elements.

Also, scene builder 1450, when ray data structure 1475 is determined, can then properly identify offsets into ray data structure 1475 for each shader to access particular additional data. For example, additional data element n.n can be an attenuation vector with 3 bytes for each of 3 color vectors, and can be indicated as starting a number of bytes after a start of data structure 1475. Thus, scene builder can be viewed as establishing a scene-wide convention wherein each shader can properly access data included in a ray data structure for its consumption. In practice, computing resources executing a given shader can use a ray identifier, which can represent a memory address, or an offset from a base memory address, stored in field 1481 to access information about a given ray. Further offsets can be made to identify particular fields in the data structure for that identified ray. Thus, the additional data elements of the ray data structure would generally be the union of the elements used by the shaders. There may be situations where an additional data element is provided in an emit ray call and not used by any shader. In such cases, scene builder 1450 can choose not to allocate space for that element. However, scene builder 1450 may allocate space anyway, to account for situations where a shader may be bound to the scene even after rendering has begun.

Shader code 1405n also is used to show a few different examples of how a ray bundle call can be implemented and used. In a first example ray bundle call 1422, the bundle specifies a common origin for rays of the bundle, separate directional information for each ray, a weight to be distributed among, or assigned to each ray, and additional data that will be attributed to rays of the bundle. A second ray bundle call 1423 illustrates a ray bundle call where exceptions can be made in the call. In call 1423, a weight w1 is specified particularly for the ray defined by the shared origin, and destination information d2. Weight w1 overrides the default provided weight, w, for the d2 ray. Otherwise, the remaining rays without exception information are assigned weight w. A third ray bundle call 1424 example shows a plurality of different origins, a destination specifier, a weight and additional information. Other implementations can be provided. For example, a preconfigured set of scene lights can be established, and ray bundle calls can refer to that set of lights to specify shadow rays. In that case, a code module may be provided to accept the various origins, and based on the light destinations, construct directions for each ray of the bundle and store those origins and directions as independent rays in a ray memory. Alternatively, the rays can be stored with a reference to their destination, and respective directions can be constructed before intersection testing of a given ray.

FIG. 14 also depicts particular examples of other data that can be included in ray emission calls according to these examples. Shader 1405a includes variants of the EmitRay call in which a ray reference (e.g., "parentrayref") can be included. A ray reference can be included to allow attributes available from the referenced ray to be obtained from that ray. The API and/or compiler code for such a call would cause the referenced ray to be maintained in memory until all rays that reference it have completed. To accomplish that maintenance, a count of references can be maintained during scene rendering; that count can be decremented as rays complete, and incremented as rays are emitted which reference that ray. In prototypical cases, the referenced ray can be a parent of numerous child rays, however, a referenced ray need not be related to the referencing ray(s).

Shader 1405a further includes an example of including a pointer to a code segment with an emit ray call. This pointer would be maintained with data for the emitted ray, and if an intersection is detected for that ray, then the pointer can be provided to the shader that will be run for that newly detected intersection (the "next" shader). The next shader can use referenced code for any of a variety of purposes. In some cases, the referenced code can be run after the shader code completes. For example, the referenced code can cause redirection of a color contribution to a different buffer than a default buffer (e.g., a buffer for the pixel associated with the ray). Similarly, shader code 1405a further depicts that code can be included in an emit ray call, and such code can serve similar purposes and accomplish similar or the same ends.

Figure 15:
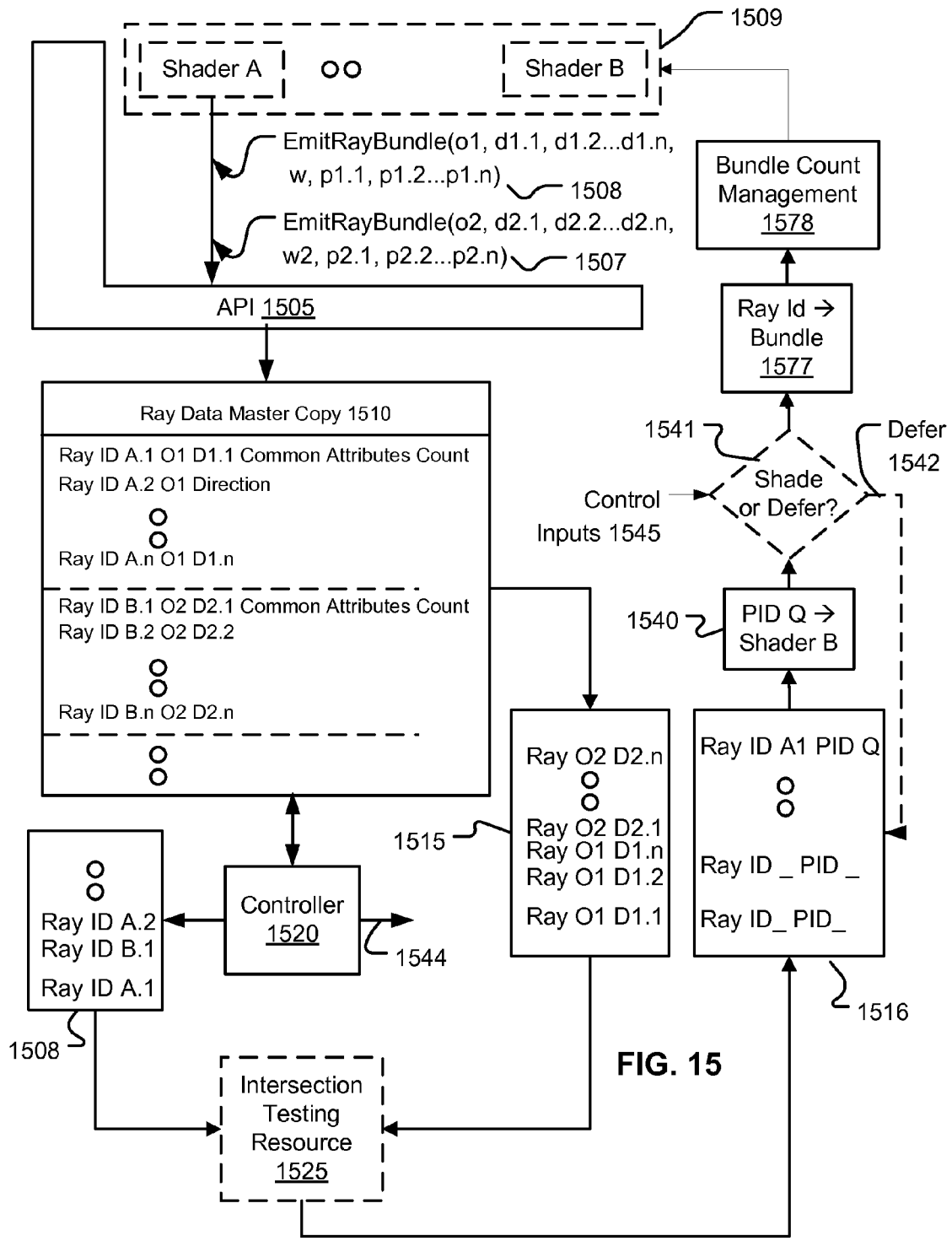
FIG. 15 illustrates system architecture in which a ray bundle API call can be used.

FIG. 15 depicts aspects of an overall system in which shaders can use an API for non-recursive ray tracing, and in particular, the example primarily illustrates usage of a ray bundle emission call. Shading resource 1509 depicts computational resources configured for executing a plurality of shaders (shader A and shader B illustrated). A first ray bundle emission 1508 specifies a shared origin, o1, and a plurality of directions d1.1 through d1.n, and a weight, w shared by the rays. A variety of parameters can be specified for inclusion in the call, and are illustrated as p1.1 through p1.n. Similarly, a second ray bundle emission, 1507, is depicted as defining the bundle with an origin o2, a plurality of directions d2.1 . . . d2.n, and a weight w2 associated with the rays. As with the ray bundle call 1508, this bundle also can include a variety of parameters that can be specified for the bundle. There is no implication by these disclosures that ray bundle calls must have a given minimum or maximum number of rays, parameters, or the like specified. As described previously, the parameters can specify exceptions for defaults, or can directly specify certain parameters.

These ray bundle calls can be provided by an API semantic 1505, such that when shaders use these calls, a compiler or other software that is preparing to render a scene can appropriately interpret these calls based on that semantic.

The API, as implemented on a given system, and during shader execution (i.e., during rendering of a scene, code implementing a ray bundle call can be activated by an executing shader making a reference to it). Such execution interoperates with a memory storing a master copy 1510 of ray data defining rays that have been emitted for intersection testing, but generally which have not yet completed intersection testing. Some of these rays generally are being actively intersection tested in an intersection testing resource 1525, while others of these rays await intersection testing.

Ray data master copy 1510 includes an identifier for each ray, and definition data (e.g., origin and direction information), and any parameter information specified for the ray or rays when it was emitted by a shader. Ray data master copy 1510 illustrates a particular example where rays of a bundle can be stored such that common attribute information among rays of a bundle is specified for only 1 ray of the bundle. As will be explained, the ray where those parameters are specified also can include count information that tracks whether rays of such a bundle have completed, and that ray is maintained in memory until all the other rays of that bundle have completed, so that the parameters remain available.

A controller 1520 manages master ray data copy 1510 and determines which rays are to begin intersection testing, and update master copy 1510 as intersection testing results become available and as shaders continue to emit new rays.

Also, in this particular example, a queue of ray identifiers 1508 is populated under control of controller 1520. Queue 1508 is read by intersection testing resource 1525, when it can accept new rays for intersection testing. In an example, data defining the rays identified by ray identifiers in the queue are separately provided in a queue 1515 for storage in a localized memory in the intersection testing resource 1525 (not illustrated here). In some cases, queue 1515 need not be provided, and ray definition data can be DMA'ed to one or more local memories accessed by intersection testing resource 1525.

Intersection testing resource 1525 outputs intersection testing results to a results queue 1516, and typically includes an identifier for a primitive intersected, and the ray identifier. For example, results queue 1516 includes, as one entry, ray ID A1, and Primitive ID Q. Controller 1520 (or another functional block) can determine that primitive Q maps to Shader B (i.e., that shader B determines how primitive Q behaves). Subsequently, a decision whether Shader B is to be executed for primitive Q is made (1541). That decision can be made based in part on control inputs 1545. Such control inputs can include indications of current resource usage, such as current usage or occupancy of a total available memory space for ray data master copy 1510. The decision to shade or not (1541) also can use information about shader B, which could have been derived at compilation time, or is otherwise inferred based on contents of shader B. Decision 1541 also can be made based on a weight associated with the ray, or another suitable indication of relative importance of the ray to the scene.

In a particular example, a control input 1545 includes that a current memory usage is greater than a threshold value. In that case, the decision to shade or defer 1541 that particular ray (A1) is made to avoid emitting a large number of new rays that need to be stored. A heuristic to determine whether it is likely that shading ray A1 is likely to cause emission of a large number of new rays can use the weight associated with the ray. The higher such a weight is, the more likely it is that the shader Q for ray A1 would emit a larger number of new rays during shading. Thus, if ray A1 has a relatively high weight, then shading of ray A1 can be deferred, which can include putting the ray into a point farther back in queue 1516 using a deferral communication channel 1542. Of course, such deferral also can be accomplished by marking an entry for ray ID A1 as being deferred, or still further, skipping that ray, leaving it in its present location in queue 1516. Other ways to implement such ray shading deferral can be implemented.

In an example tied more closely to a ray bundle API implementation, one usage of weights associated with rays is for tracking a relative importance of rays to a particular pixel (which can be identified as a parameter in the ray bundle API call). For example, if 5 camera rays are emitted for a given pixel, each may be assigned a weight of 0.2. If one of those camera rays hits a primitive associated with a shader that does a diffuse lighting shader that emits 50 rays, then each of those diffuse lighting rays can have a weight about 1/50 of their parent ray weight of 0.2. However, if another camera ray hits a mirror shader that emits only 1 ray, then that mirror ray would have a weight about equal to its parent ray. So, in the context of a ray bundle call, a parent ray weight can be provided in the ray bundle call, whereupon it is divided among the rays of the bundle. Thus, weights of rays in a bundle often can be related to a ray whose shader included the API call for that bundle.

Continuing with this example, assume that both the 50 diffuse lighting rays and the mirror ray were intersection tested, and that ray A1 represents one of the diffuse lighting rays. Because that ray would be associated with a weight divided among 50 sibling rays, it would have a comparatively low weight, and would be unlikely to cause a large number of additional rays to be emitted in an appropriately written shader. Therefore, if it is desired to reduce a number of rays stored in memory, then that low weight ray is immediately shaded, and not deferred. By contrast, when the mirror ray completes intersection testing, a shader associated with its intersected primitive would be more likely to emit a larger number of rays when shading that intersection. Thus, shade or defer decision, if operating to reduce an amount of memory used for ray storage (e.g., size of master copy 1510), then the decision would be to defer that mirror ray (called a mirror ray by virtue of a general purpose of the shader that emitted it).

If the decision to shade a given ray intersection is affirmative, then there can be mapping between the ray ID for that ray and its associated bundle (if there is such a bundle—there need not be, as rays can be emitted singly, or even if emitted using a bundle call, then can all be stored with completely distinct and independent information). Then, a count of remaining rays of that bundle can be updated 1578. The shader for the ray can be executed in shader computation resources 1509.

Control inputs 1545 can comprise a variety of other information about system usage. For example, control inputs 1545 can comprise an upper bound, above which higher weight rays are to be deferred for shading, and a lower resource bound at which higher weight rays are to be preferred for shading. Further information can include an average weight for the rays that are currently stored in ray data master copy 1510, trend information about such ray weight, and the like.

Further aspects of that can be employed in ray emit calls, including a ray bundle call, is provision of an enumerated variable defining a type of ray being emitted with the ray emit call. A ray type can be selected from a defined enumeration made available through the programming semantic. The enumeration can be determined during a start-up phase. Depending on a number of enumerated types desired to be supported, a number of bits to be allocated to a ray type field can be selected. The programming semantic can provide a mapping between more easily understood ray type names and the bit string assigned to each ray type. Examples of ray types include occlusion rays, reflection rays, and refraction rays. Each ray type can be defined to include a plurality of attributes. A globally accessible memory location can be provided storing ray type information, and such ray type information can be customized. Ray type information also can be hierarchical, with some ray types sharing attributes defined in referenced ray types. One attribute that can be assigned to each ray type is a default shader that should be executed for that ray.

Figure 16:
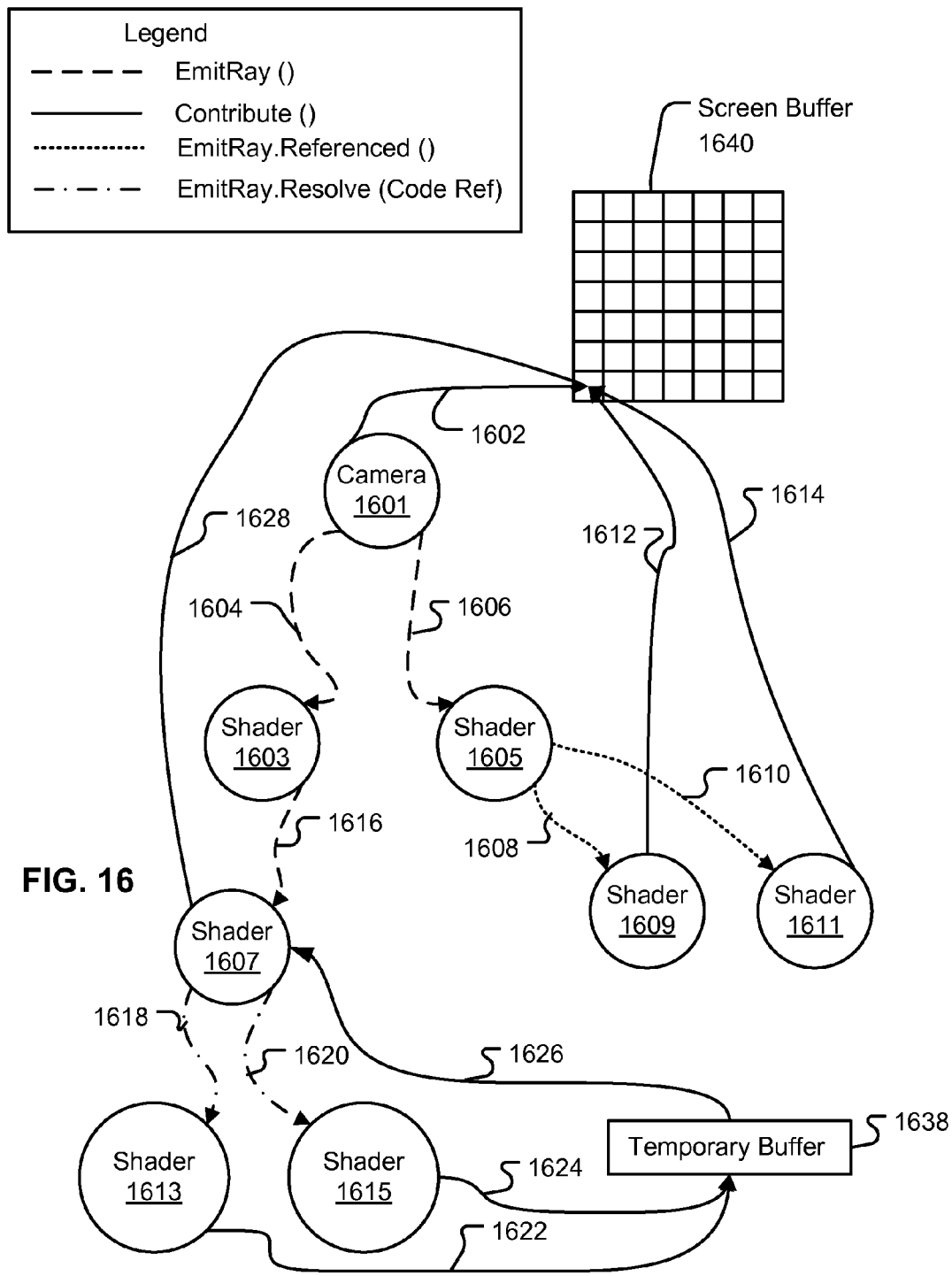
FIG. 16 depicts an example of how shader state can be maintained in a system providing non-recursive ray tracing, and using API calls according to examples herein.

FIG. 16 depicts aspects of how non-recursive ray tracing may trace a sequence of rays during scene rendering, hitting various objects, whose shaders cause emission of further rays. In particular, FIG. 16 depicts an example of how code propagated through rays can be used to modify "downstream" shader behavior (downstream here can be contrasted with the recursive concept of rolling up an existing tree of rays).

FIG. 16 includes shaders, numbered with odd integers. In this example, API calls available to shaders are illustrated in the legend, and include a simple EmitRay call which accepts ray definition data, and causes intersection testing of the emitted ray. Another call is a Contribute call, which allows contribution to a buffer, and can default to an identified location for a ray involved in an intersection being shaded. The EmitRay call can be modified to be a referenced call, which allows referencing another ray for data used in defining the ray being emitted. Such a referenced call can be extended to a ray bundle call (not depicted here). Another ray call depicted is an EmitRay call that allows a specified resolution routine to be run, and can accept code or a reference to code. Combinations of these basic examples can be provided; for example, a resolve type emit ray call can also reference another ray, and thereby be a combination of a referenced-type EmitRay call and a resolve-type call.

Below, FIG. 16 will be described first at a summary level, and then aspects thereof are further described with respect to FIG. 17.

In FIG. 16, it is depicted that a camera shader 1601 runs, and emits rays 1604 and 1606; it further is depicted that camera shader can contribute directly to a location of a screen buffer 1640. Rays 1604 and 1606 are each intersection tested. It is depicted that a shader 1605 is identified based on an intersection for ray 1606, and shader 1605 emits two referenced rays 1608 and 1610. The reference can be to ray 1606. In turn, shaders 1609 and 1611 execute, and their respective executions cause contributions 1612 and 1614 to the screen buffer 1640 location.

Tracing of ray 1604 causes identified and execution of shader 1603, which emits ray 1616 through use of the resolve modification of the EmitRay call. Ray 1616 is traced, causing identification of shader 1607, which executes to emit rays 1618 and 1620, which maintain the resolve-type call, and which further cause execution of shaders 1613 and 1615.

Shader 1607 in this example includes code to implement an effect that varies an output based on final color results obtained by testing the rays that it emits. Normally, in a recursive renderer, state of shader 1607 is simply going to be put on a stack after it emits rays to be tested, and it will be re-activated during rollup of the tree of rays. However, in a non-recursive renderer, it is typically the case that shader state is not maintained. Therefore, it is desirable to allow such a function to be implemented in a non-recursive ray tracing, while still getting the benefits of non-recursive tracing for the vast majority of shaders that do not involve such a situation.

Rays 1618 and 1620 are traced, causing identification and execution of shaders 1613 and 1615, which are depicted to have only respective contribution calls 1622 and 1624 and do not emit further rays. Now, in a default case, contribution calls 1622 and 1624 would write to screen buffer 1640. However, by using the resolve type command, with code (or reference to code), the contribute call can be modified or redirected to cause writing of these results (using the same contribute call) to a temporary buffer 1638. In a typical case, there may be many more rays, and more "generations" of rays to be tested, such that the temporary buffer may accumulate contributions from a number of contribute calls that maintain the resolve command. When they all complete, shader 1607 can be reinvoked and the code provided (or referenced) can return a value from the temporary buffer to shader 1607, which can use that information in formulating a contribution that is made through contribute call 1628 to screen buffer 1640.

Figure 17A:
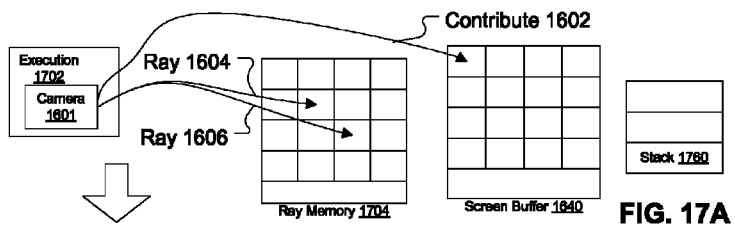
FIGS. 17A-17E depict a build of memory state during the example of FIG. 16.

FIGS. 17A-E depict a build relating to aspects of memory state, in order to emphasize a difference between a typical recursive approach and the present example. FIG. 17A depicts an active execution of camera shader 1601, which emits rays 1604 and 1606 for storage in ray memory 1704, and contribution 1602 to a part of screen buffer 1640.

Further, FIG. 17A depicts a stack 1760, on which any shader that needs maintain state is kept. When stack 1760 is not separately depicted in FIGS. 17A-17E, it stores no shader state relevant to this discussion.

Figure 17B:
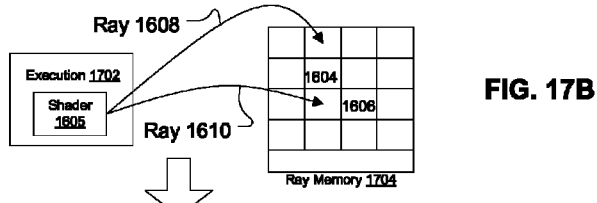

FIG. 17B depicts now that shader 1605 executes, emitting rays 1608 and 1610 that each find storage locations in ray memory 1704. Although normally, ray 1606 can be removed from ray memory 1704, after completion of testing (as evidenced by execution of shader 1605), shader 1605 emits rays 1608 and 1610 using a referenced call, and more particularly to reference ray 1606. Thus, since ray 1606 was referenced, it is maintained.

Figure 17C:
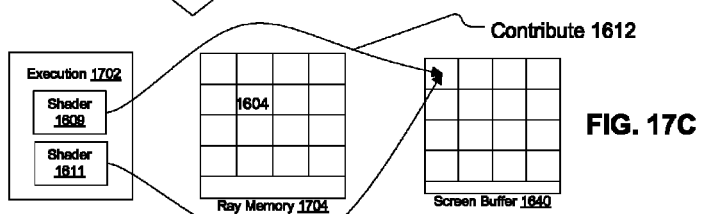

FIG. 17C depicts execution 1702 both of shader 1609 and of shader 1611 (no restriction is made on a number of shaders that can be concurrently executing, as that is implementation-dependent). Each of those shaders makes respective contributions as described above. Now that rays 1608 and 1610 have completed intersection testing and their respective shaders did not emit further referenced rays, all of rays 1608, 1610 and 1606 can be removed or allowed to be overwritten in memory (i.e., memory locations determined free).

Figure 17D:
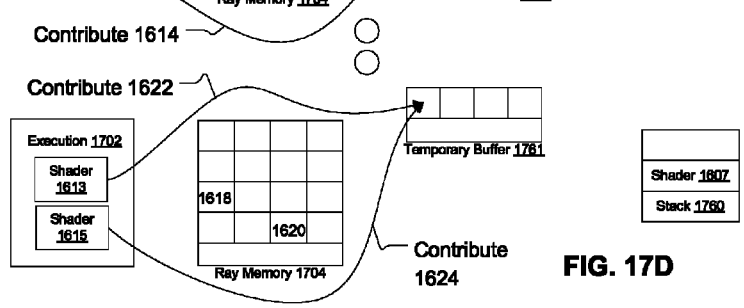

Between FIGS. 17C and 17D, execution of shader 1603 and 1607 occur, but is not depicted. FIG. 17D depicts execution 1702 of shaders 1613 and 1615, and storage of rays 1618 and 1620 emitted by shader 1607, as well as removal of ray 1604, being that shader 1603 did not reference it in ray emission.

It was described above that shaders 1613 and 1615 were invoked because of intersections with rays that were emitted with a resolve-type call, which included code or a code reference to cause modification of how shaders 1613 and 1615 ultimate affect the larger process of rendering. More particularly, the resolve-type call caused the contribute call to be redirected for these shaders such that when they use that call, the results are fed to a temporary buffer 1761 and not to screen buffer 1640. Stack 1760 now stores state for shader 1607.

Figure 17E:
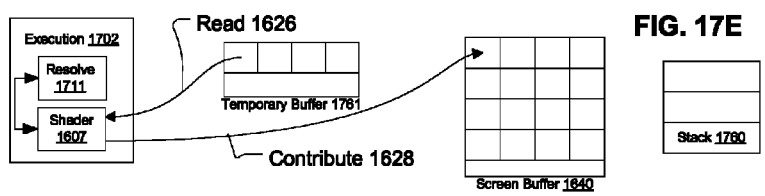

FIG. 17E depicts execution of a resolve code snippet 1711 and shader 1607, which was re-entered and removed from stack 1760. Shader 1607 can read from buffer 1761 (or be provided contents of that buffer by resolve 1711). Shader 1607 can then formulate data to be provided in contribute call 1628, and now stack 1760 is empty again.

Thus, FIG. 16 and FIGS. 17A-E depict that in normal circumstances, little shader state would be stored in non-recursive ray tracing, and API calls (more generally, API capabilities) also can be provided to handle those shading effects for which allowing a re-entrance to stateful shaders to be provided would be beneficial or desirable.

It was disclosed in various examples that an attenuation vector may be provided with a ray emitted through the disclosed API calls. The usage of the attenuation vector can be according to a convention established by the shader author(s), and operations on it can generally be in accordance with multiplying components of the vector by other numbers. Usually, such multiplication will be with numbers less than one, such that the attenuation vector expressed an attenuation of light energy during tracing. However, the numbers can be arbitrary and need not be less than 1.0.

As described an attenuation vector is one example of data that can be included with a ray emitted through the described ray emit API calls (e.g., ray emit and ray bundle emit). Another example of such data is usage of an enumerated ray type variable, which allows incorporation of various data fields and attributes by reference to a canonical ray type. User defined data can be submitted with rays as well. Another example of such data is code and a further example is a pointer to code. Preferably, the API calls accept rays to be emitted which include or refer to state that will be required to shade an intersection involving that ray.

In one example of a system architecture, which can be used with an API according to these disclosures, shaders can be associated with locations or surfaces in a scene (e.g., a 3-D scene generally according to the above examples and description). This architecture can be applied more generally to satisfy read queries (i.e., queries that do not update or modify defined portions of a dataset being used) for a dataset with elements that can be defined over a large number of parameters (e.g., an n-dimensional dataspace). For example, a dataset can comprise discrete points or surfaces that can be located in the n-dimensional dataspace by assigning respective values or ranges of values for the parameters).

In one preferable aspect, each of the elements is associated with one or more code modules that can be executed. Each of the code modules can use any portion of the API semantic (e.g., one or more of API calls, associated parameters, scene-wide constructs, according to the examples as applied to a generalized n-dimensional database query construct). For example, the API semantic can provide calls for emitting a query or a bundle of queries. Each code module also can use a contribute call that allows write operations to be performed on a globally-accessible buffer or set of buffers. Globally-accessible as used here includes that the scope of visibility of the buffer is not confined within a code module, and that values can be written to the buffer at any time during code execution, rather than only at completion of a modules execution. As such, the globally-accessibility of the buffer(s) to the contribution call can be contrasted with a recursive rollup of returned values, where as each function completes, a value is returned to an instantiating code module.

In addition, each query can include state or other information that can be used by a code module that was identified based on its association with an element of the dataset that satisfies criteria of the query. Code and/or a pointer to code also can be included with a query, which allows a query to affect what operations will be performed by the code module. Thus, state is transferred and results provided by a given code module through usage of emit and contribute calls according to this disclosure. Preferably, a given code module is written to use the emit and contribute calls to express its effect (complete its functional purpose), such that memory and processing resources allocated to it can be freed. By contrast, code modules written to a recursive programming paradigm would remain resident while waiting for a value to be returned from a function call. Typically, that code module would be allocated a thread, which can stall while awaiting that value. Maintaining the thread context, and switching it from active to stalled mode, and back, adds overhead that preferably is avoided.

The architecture described above thus provides a mechanism for organizing a dataset with a plurality of entries, each defined over a large number of parameters, and associated with a code module to be run when a query is satisfied by that entry. In turn, that code module can emit further queries and also write to a globally-visible buffer location. Each query also can carry state, code and pointers to code.

Thus, the architecture provides a mechanism of determining an order of execution of code modules, as well as input data elements that will be used in their execution. More typical programming paradigms generally prescribe a program flow where code modules include pre-defined linkages with other code modules, such as calling a specified code module or modules, if certain conditions are found to be true. Here, however, it is contemplated that code modules interface through a common API, which provides an ability to emit queries, with defined parameters, to be made of a dataset, and based on which elements of the dataset satisfy the query, one or more further code modules will be selected for execution. The data upon which those one or more further code modules will execute can come in part from the query itself, and also can come from other data in the dataset.

Systems, methods and computer readable media embodying aspects of the above description related to accepting shaders and determining a ray data structure for additional data elements inclusive in the ray data structure can be provided. In these cases, additional data elements also can be embodied by references, such as memory references, logical or physical, rather than directly representing a given data value. The references can be used to retrieve corresponding data from one or more memories. The additional data elements can be associated with a data type when originally defined in shader source code (e.g., integer, float, double, string, and so on). These data types can be used by scene builder 1450 in determining a ray data structure and for correlating elements among shaders. Scene builder 1450 can be embodied in systems and code that also provide the API aspects related to contributing color and emitting rays, as described above. For example, an API can include calls for submitting shader code, geometry, textures, and so on, in addition to calls used by shaders during runtime. After an application has submitted such information through the API, the application can indicate that the scene is ready to be rendered.

Examples of applications of additional data include attenuation vector(s), associating weights or masses or other physical attributes with rays, mathematical operations such as filtering or blending specifications, flags indicating or influencing shader behavior, executable code (e.g., code for procedural geometry that can modify or influence the scene or objects in the scene), and so on.

Code for any method can be stored in computer readable media, such as solid-state drives, hard drives, CD-ROMs and other optical storage means, transiently in nonvolatile memories as well as embodied in communication signals. When such code is embodied in a communication signal and that signal is read and processed by a computer, the computer uses that signal and its physical medium as a computer readable medium.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Some aspects of the API described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. Various names were provided for particular coding concepts in both recursive and non-recursive ray tracing (e.g., Trace Ray( ), Emit Ray( ), and EmitRayBundle( )). These names imply no requirement as to what code performing these functions needs to be called in an implementation.

The various examples described above are provided by way of illustration only and should not be construed as limiting. For example, only a limited example of ray tracing behavior was presented, and it would be understood that practical implementations involve many more rays, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other ray tracing/ray shading implementations, and no implied limitation as to its application exists from the systems, methods, and other disclosure used to explain examples thereof.

We claim:

1. A method for interfacing with computer executable shader code, comprising:
    accepting, through a ray emit call, definition data for a parent ray and an association of the parent ray to a pixel of a 2-D image to be rendered from a 3-D scene composed of objects;
    selecting a shader based on an intersection testing result for the parent ray;
    accepting one or more child rays from the selected shader through the ray emit call during execution of the selected shader;
    accepting through the ray emit call additional data to be associated with the one or more child rays;
    continuing the pixel association with each of the child rays;
    selecting one or more shaders based on intersection testing results obtained for at least some of the child rays;
    interpreting the additional data associated with the one or more child rays as a reference to executable computer code; and
    modifying behavior of the selected one or more shaders by executing the referenced executable computer code.

2. The method of claim 1, wherein the contribution(s) are accepted without re-entering the shader for the parent ray.

3. The method of claim 1, further comprising accepting contribution(s) directly into a buffer location, through a contribute call, from any of the shaders selected for the child rays during execution of the selected shaders, wherein the buffer location is selected from the buffer location associated with the pixel and a buffer location identified from the additional data.

4. The method of claim 3, wherein the contribution is based at least in part on an attenuation vector accepted through the ray emit call with the acceptance of the one or more child rays.

5. The method of claim 3, wherein the contribution is a contribution of color, and a total color contribution capacity of the parent ray to the pixel is distributed among the plurality of child rays by the first shader using respective attenuation vectors derived from an attenuation vector associated with the parent ray, and received through the ray emit call.

6. The method of claim 3, wherein the contribution accepted from the contribute call is redirected as specified by code, either referenced or included in the additional data.

7. The method of claim 1, wherein the association of the parent ray to the pixel is determined either through acceptance of pixel identifying data through the ray emit call or through an association implied by a shader emitting the parent ray.

8. The method of claim 1, wherein the accepting of one or more child rays comprises accepting data specifying a plurality of child rays, the data comprising data describing an attribute shared among the plurality of child rays, wherein the attribute comprises one of an origin and a direction shared among the plurality of child rays.

9. The method of claim 1, wherein the accepting of one or more child rays comprises accepting data specifying a value from an enumerated list of ray types.

10. The system for tracing rays in a scene, comprising:
a ray intersection testing resource operable to test rays for intersection in the scene;
a buffer for accumulating shading results;
computer readable media storing code for implementing a programming interface, the programming interface comprising an emit ray call, wherein the emit ray call is operable to accept an association between a pixel of an image being rendered, definition data for one or more rays, and data additional to the definition data for the one or more rays, the ray emit call for use by shaders to specify rays to be intersection tested, and a contribute call for interfacing shaders with the buffer by accepting, during shader execution, data representative of a result to be contributed directly to one or more locations in the buffer, wherein the additional data is interpretable during execution of a shader as a reference to computer executable code that modifies behavior of the executing shader that received the additional data.

11. The system of claim 10, further comprising a computer readable media storing computer executable code for causing the system to select shaders to be executed, responsive to intersection testing results received from the ray intersection testing resource.

12. The system of claim 11, wherein the system is operable to select shaders responsive to an intersection testing result indicating an intersected object by selecting a shader associated with that object to be executed.

13. The system of claim 12, wherein the shader is selected using a primitive identifier provided in the intersection testing result.

14. The system of claim 11, wherein the system is operable to select shaders responsive to an intersection testing result indicating absence of object intersection by selecting a default shader to be executed.

15. The system of claim 14, wherein the default shader is determined based on a type of ray associated with the intersection testing result.

16. The system of claim 10, wherein the scene is composed of objects, and the system is further configured to identify a shader to be executed, based on results of intersection testing a parent ray with the scene objects, and during execution of that shader, to receive one or more of a child ray to be intersection tested through the emit ray call and a result to be contributed to the buffer through the contribute call.

17. The system of claim 10, wherein the shader identified is operable to use the emit ray call to emit a child ray with the arbitrary data made available to it.

18. The system of claim 10, wherein the additional data comprises type information for the ray being emitted.

19. The system of claim 18, wherein the type information comprises a selection from an enumeration of ray types.

20. The system of claim 10, wherein the additional data comprises reference ray information that identifies a ray from which attributes applicable to the child ray can be obtained.

21. The system of claim 20, wherein the additional data comprises a count of a number of other rays that reference the first ray for attribute contribution.

22. The system of claim 10, wherein the programming interface is operable to accept, from shaders programmed to use the emit ray call, data that will be passed between shaders, via ray data structures, where one or more shaders selected to receive that data are determined by intersection testing rays defined with the ray data structures.

23. The system of claim 10, wherein the programming interface provides the emit ray call with a capability to accept data defining a plurality of rays.

24. The system of claim 23, wherein the emit ray call provides for accepting ray definition data for the plurality of rays as partially shared specification data, and partially distinct ray data.

25. The system of claim 10, wherein the emit ray call accepts additional data, for interpretation by a shader identified based on intersection testing results of the emitted ray, to modify behavior of the shader with respect to light emitted, reflected, or refracted by it.

26. The system of claim 10, wherein the emit ray call provides for acceptance of a weighting factor to be distributed among a bundle of rays specified by data provided through the emit ray call.

27. The system of claim 10, wherein the emit ray call provides for definition of rays at least partially parametrically.

28. A non-transitory computer readable medium storing computer readable instructions for execution on a computer to implement a shading interface method, comprising:
accepting data from a first shader comprising an origin and a direction for a ray to be intersection tested in a 3-D scene;
accepting, from the first shader, additional data to associate with the ray; and
causing the additional data to be communicated to a second shader that is identified based on results of intersection testing the ray, and wherein the additional data is interpreted to modify behavior of the second shader, wherein the modification comprises redirecting a write to a memory location to be executed, from a memory location for a pixel associated with the ray.

29. The non-transitory computer readable medium of claim 28, wherein the results of intersection testing the ray comprise an identification of a primitive intersected by the ray, and which is associated with the second shader.

30. The non-transitory computer readable medium of claim 28, wherein the computer readable medium stores computer executable code for the second shader, the code for the second shader operable to interpret the additional data to modify behavior of the second shader with respect to light emitted, reflected, or refracted by it.

31. The non-transitory computer readable medium of claim 28, wherein the additional data comprises shading code to be used by the second shader, or a pointer to code to be used by the second shader.

32. The non-transitory computer readable medium of claim 28, wherein the additional data comprises shading code, or a pointer to shading code, to be run after completion of the second shader.

33. The non-transitory computer readable medium of claim 28, wherein the second shader includes computer executable code for writing directly to a buffer location in closing state for the second shader.

* * * * *